United States Patent
Lian et al.

(10) Patent No.: US 11,801,764 B2
(45) Date of Patent: Oct. 31, 2023

(54) ENERGY CONVERSION DEVICE AND VEHICLE

(71) Applicant: BYD COMPANY LIMITED, Guangdong (CN)

(72) Inventors: Yubo Lian, Shenzhen (CN); Heping Ling, Shenzhen (CN); Jicheng Li, Shenzhen (CN); Hua Pan, Shenzhen (CN); Feiyue Xie, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 34 days.

(21) Appl. No.: 17/635,620

(22) PCT Filed: Aug. 13, 2020

(86) PCT No.: PCT/CN2020/108925
§ 371 (c)(1),
(2) Date: Feb. 15, 2022

(87) PCT Pub. No.: WO2021/027879
PCT Pub. Date: Feb. 18, 2021

(65) Prior Publication Data
US 2022/0289053 A1     Sep. 15, 2022

(30) Foreign Application Priority Data
Aug. 15, 2019 (CN) .......................... 201910755870.2

(51) Int. Cl.
| | |
|---|---|
| *H02M 7/68* | (2006.01) |
| *B60L 53/24* | (2019.01) |
| *B60L 53/22* | (2019.01) |
| *B60L 58/15* | (2019.01) |

(Continued)

(52) U.S. Cl.
CPC ............... *B60L 53/24* (2019.02); *B60L 53/22* (2019.02); *B60L 58/14* (2019.02); *B60L 58/15* (2019.02); *H02J 7/0068* (2013.01); *H02M 7/797* (2013.01)

(58) Field of Classification Search
CPC .......... B60L 53/24; B60L 53/22; B60L 58/14; B60L 58/15; H02M 7/797; H02J 7/0068
See application file for complete search history.

(56) References Cited

U.S. PATENT DOCUMENTS

| | | | |
|---|---|---|---|
| 7,816,805 | B2 | 10/2010 | Tanaka et al. |
| 7,891,451 | B2 | 2/2011 | Oyobe et al. |

(Continued)

FOREIGN PATENT DOCUMENTS

| | | |
|---|---|---|
| CN | 101454958 A | 6/2009 |
| CN | 101459344 A | 6/2009 |

(Continued)

OTHER PUBLICATIONS

International Search Report and Written Opinion for Application No. PCT/CN2020/108925, dated Oct. 28, 2020, 12 pages.

*Primary Examiner* — Jared Fureman
*Assistant Examiner* — Esayas G Yeshaw

(57) ABSTRACT

The present invention relates to the technical field of vehicles, and provides an energy conversion device and a vehicle. The energy conversion device includes a reversible pulse-width modulation (PWM) rectifier, a motor coil connected with the reversible PWM rectifier, a one-way conduction module, and a capacitor. A DC charging circuit or a DC discharging circuit is formed by an external DC port with an external battery by using the energy conversion device, and a driving circuit is formed by the external battery with the reversible PWM rectifier and the motor coil in the energy conversion device. The one-way conduction module is connected between a first end of the capacitor and a (Continued)

second end of the external DC port, or the one-way conduction module is connected between a second end of the capacitor and a first end of the external DC port.

18 Claims, 14 Drawing Sheets

(51) Int. Cl.
*B60L 58/14* (2019.01)
*H02J 7/00* (2006.01)
*H02M 7/797* (2006.01)

(56) References Cited

U.S. PATENT DOCUMENTS

| | | | |
|---|---|---|---|
| 9,908,430 B2* | 3/2018 | Gorka | B60L 15/02 |
| 2009/0134700 A1* | 5/2009 | Tanaka | B62D 5/046 |
| | | | 307/10.6 |
| 2018/0147947 A1 | 5/2018 | Gebhart | |
| 2020/0220479 A1* | 7/2020 | Miyazaki | H02P 29/032 |

FOREIGN PATENT DOCUMENTS

| | | |
|---|---|---|
| CN | 102684248 A | 9/2012 |
| CN | 107979321 A | 5/2018 |
| CN | 109687722 A | 4/2019 |
| CN | 109789799 A | 5/2019 |
| CN | 109823234 A | 5/2019 |
| EP | 1112896 A1 | 7/2001 |
| EP | 2062801 A1 | 5/2009 |
| EP | 3434508 A1 | 1/2019 |
| JP | 2014-161142 A | 9/2014 |
| JP | 2014226000 A | 12/2014 |
| JP | 2015-233355 A | 12/2015 |
| WO | 2015045013 A1 | 4/2015 |
| WO | 2018/067880 A1 | 4/2018 |

* cited by examiner

ENERGY CONVERSION DEVICE AND VEHICLE

CROSS-REFERENCE TO RELATED APPLICATIONS

This application is a National Phase Application of International Patent Application No. PCT/CN2020/108925 filed on Aug. 13, 2020, which is based on and claims priority to and benefits of Chinese Patent Application 201910755870.2, filed on Aug. 15, 2019 and entitled "ENERGY CONVERSION APPARATUS AND VEHICLE". The entire content of all of the above identified applications is incorporated herein by reference.

FIELD

The present disclosure relates to the field of vehicle technologies, and more specifically, to an energy conversion device and a vehicle.

BACKGROUND

Due to a limitation on a driving range of a pure electric vehicle, a vehicle driver is very concerned about a problem of the vehicle breaking down due to the exhaustion of the power. Although many vehicle manufacturers remind the vehicle driver of remaining battery power information and low battery warning information by using a vehicle dashboard or other methods, it is inevitable that the remaining power of the vehicle is insufficient to drive the vehicle to a location of the charging facility or the driver runs out of the vehicle battery unconsciously.

SUMMARY

The present disclosure provides an energy conversion device and a vehicle, so as to discharge an electric device or be charged by a charging device.

The present disclosure is implemented in the following way. A first aspect of the present disclosure provides an energy conversion device, including a reversible pulse-width modulation (PWM) rectifier, a motor coil connected with the reversible PWM rectifier, a one-way conduction module and a capacitor. The reversible PWM rectifier further includes a first bus terminal and a second bus terminal, a neutral line of the motor coil is connected with a first end of the capacitor, and the second bus terminal of the reversible PWM rectifier is further connected with a second end of the capacitor.

A direct current (DC) charging circuit or a DC discharging circuit is formed by an external DC port with an external battery by using the energy conversion device, and a driving circuit is formed by the external battery with the reversible PWM rectifier and the motor coil in the energy conversion device.

The one-way conduction module is connected between the first end of the capacitor and a second end of the external DC port, a first end of the external DC port is connected with the second end of the capacitor and a negative electrode end of the external battery, and a positive electrode end of the external battery is connected with the first bus terminal of the reversible PWM rectifier; or the one-way conduction module is connected between the second end of the capacitor and the first end of the external DC port, the second end of the external DC port is connected with the first end of the capacitor, the second end of the capacitor is connected with a negative electrode of the external battery, and a positive electrode of the external battery is connected with the first bus terminal of the reversible PWM rectifier.

A second aspect of the present disclosure provides an energy conversion device, including:
a one-way conduction module, including a diode, wherein an anode and a cathode of the diode are a first end and a second end of the one-way conduction module respectively;
a capacitor;
a reversible PWM rectifier, including a plurality of bridge arms, wherein first ends of the plurality of bridge arms are connected together to form a first bus terminal; and second ends of the plurality of bridge arms are connected together to form a second bus terminal;
a motor coil, wherein first ends of the motor coil are connected with midpoints of the plurality of bridge arms; second ends of the motor coil are connected with the first end of the one-way conduction module and a first end of the capacitor by leading out a neutral line; and a second end of the capacitor is connected with the second bus terminal;
a charging or discharging connection end set, including a first charging or discharging connection end and a second charging or discharging connection end, wherein the first charging or discharging connection end is connected with the second end of the capacitor by using a first switching device; the second charging or discharging connection end is connected with the second end of the one-way conduction module; and the first end of the capacitor is connected with the second end of the one-way conduction module by using the first switching device; or the first charging or discharging connection end is connected with the first end of the one-way conduction module; the second end of the capacitor is connected with the first end of the one-way conduction module by using a first switching device; and the second charging or discharging connection end is connected with the first end of the capacitor by using the first switching device.

A third aspect of the present disclosure provides a vehicle. The vehicle further includes the energy conversion device provided in the first aspect.

The present disclosure provides an energy conversion device and a vehicle. The energy conversion device includes a reversible PWM rectifier, a motor coil connected with a reversible PWM rectifier, a one-way conduction module, and a capacitor. The neutral line of the motor coil is connected with the capacitor, and the reversible PWM rectifier is further connected with the capacitor. The DC charging circuit or a DC discharging circuit is formed by an external DC port and an external battery by using the energy conversion device, and a driving circuit is formed by the external battery with the reversible PWM rectifier and the motor coil in the energy conversion device. By using the DC charging circuit or the DC discharging circuit formed in the energy conversion device to receive charging or discharge externally, it is possible to receive charging from the charging device when the power of the power battery is insufficient or discharge the electric device when the power of the power battery is high. In addition, the reversible PWM rectifier and the motor are both used in the DC charging circuit or the DC discharging circuit and the driving circuit, thereby implementing the functions of DC charging and discharging and driving the motor by using a simple circuit structure.

BRIEF DESCRIPTION OF THE DRAWINGS

To describe the technical solutions of the embodiments of the present disclosure more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DETAILED DESCRIPTION

Figure 1:
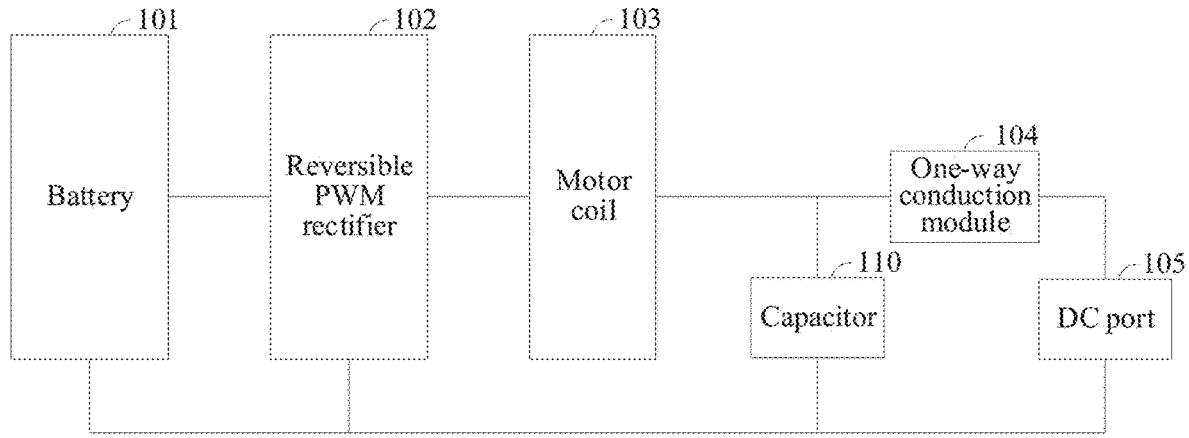
FIG. 1 is a schematic structural diagram of an energy conversion device according to Embodiment I of the present disclosure.

To make the objectives, technical solutions and advantages of the present disclosure more apparent and clearer, the following describes the present disclosure in further detail with reference to the accompanying drawings and embodiments. It should be understood that the specific embodiments described therein are merely used for explaining the present disclosure instead of limiting the present disclosure.

To describe technical solutions in the present disclosure, the following will be described by using specific embodiments.

Embodiment I of the present disclosure provides an energy conversion device, including a reversible pulse-width modulation (PWM) rectifier 102, a motor coil 103 connected with the reversible PWM rectifier 102, a one-way conduction module 104, and a capacitor 110. The reversible PWM rectifier 102 further includes a first bus terminal and a second bus terminal, a neutral line of the motor coil 103 is connected with a first end of the capacitor 110, and the second bus terminal of the reversible PWM rectifier 102 is further connected with a second end of the capacitor 110.

A charging circuit or a discharging circuit is formed by an external DC port 105 and an external battery 101 by using the energy conversion device, and a driving circuit is formed by the external battery 101 with the reversible PWM rectifier 102 and the motor coil 103 in the energy conversion device.

The one-way conduction module 104 is connected between the first end of the capacitor 110 and a second end of the external DC port 105, a first end of the external DC port 105 is connected with the second end of the capacitor 110 and a negative electrode end of the external battery 101, and a positive electrode end of the external battery 101 is connected with the first bus terminal of the reversible PWM rectifier 102.

Alternatively, the one-way conduction module 104 is connected between the second end of the capacitor 110 and the first end of the external DC port 105, the second end of the external DC port 105 is connected with the first end of the capacitor 110, the second end of the capacitor 110 is connected with a negative electrode end of the external battery 101, and a positive electrode end of the external battery 101 is connected with the first bus terminal of the reversible PWM rectifier 102.

The motor may be a synchronous motor (including a brushless synchronous motor) or an asynchronous motor. A number of phases of the motor coil 103 is greater than or equal to 2 (such as a three-phase motor, a five-phase motor, a six-phase motor, a nine-phase motor, a fifteen-phase motor, and the like). A neutral point is formed by connection points of the motor coil 103, and the neutral line is led out from the connection points. A plurality of neutral lines of the motor coil 103 may be led out. A number of poles of the motor coil 103 depends on a parallel structure of internal windings of the motor. A number of neutral lines that are led out and the number of parallel poles of the neutral line inside the motor are determined by the actual use of the solution. The reversible PWM rectifier 102 includes a plurality of phase bridge arms. A number of the bridge arms is configured according to the number of phases of the motor coil 103. Each phase includes two power switch units. The power switch unit may be a device such as a transistor, an IGBT, a MOSFET, a SiC transistor, or the like. The connection points of the two power switch units in the budge arm connected with one of a plurality of phase coils in the motor, and the power switch unit in the reversible PWM rectifier 102 may be turned on and off according to an external control signal. The one-way conduction module 104 is configured to implement one-way conduction of currents in a branch where the one-way conduction module is located. When a voltage of the one-way conduction module 104 at an input terminal is greater than a voltage at an output terminal, one-way conduction can be implemented. The energy conversion device further includes a control module. The control module is connected with the reversible PWM rectifier 102 and transmits a control signal to the reversible PWM rectifier 102. The control module may include a vehicle controller, a control circuit of the reversible PWM rectifier 102, and a BMS battery manager circuit, which are connected by using a CAN line. Different modules in the control module control the turn-on and turn-off of the power switch in the reversible PWM rectifier 102 according to the acquired information, to realize the turn-on of different current circuits. The capacitor 110 is configured to store electric energy during charging and discharging. An LC resonance circuit may be formed by the capacitor 110 and the motor coil 103, so as to realize LC oscillation. For example, the voltage of the capacitor 110 gradually increases within a period of time, while the current of the motor coil 103 gradually decreases. However, the voltage of the capacitor 110 gradually decreases within another period of time, while the current of the motor coil 103 gradually increases, thereby realizing energy storage in the motor coil 103 or the capacitor 110.

In an implementation, as shown in FIG. 1, the neutral line of the motor coil 103 is connected with the first end of the capacitor 110 and a first end of the one-way conduction module 104, a second end of the one-way conduction module 104 is connected with the external DC port 105, and the reversible PWM rectifier 102 is connected with the second end of the capacitor 110 and the external DC port 105.

Figure 2:
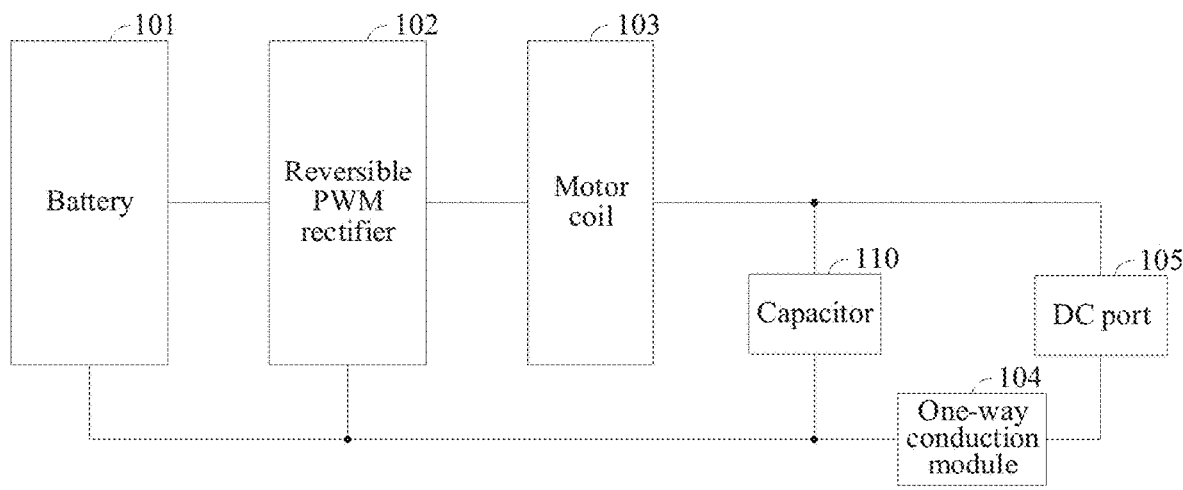
FIG. 2 is another schematic structural diagram of an energy conversion device according to Embodiment I of the present disclosure.

In another implementation, as shown in FIG. 2, the neutral line of the motor coil 103 is connected with the first end of the capacitor 110 and the external DC port 105, the first end of the one-way conduction module 104 is connected with the external DC port 105, and the reversible PWM rectifier 102 is connected with the second end of the capacitor 110 and the second end of the one-way conduction module 104.

For the first implementation, the energy conversion device may operate in a driving mode and a DC discharging mode.

When the energy conversion device operates in the driving mode, a driving circuit is formed by the external battery 101 with the reversible PWM rectifier 102 and the motor coil 103. The external battery 101 provides DC to the reversible PWM rectifier 102, and the reversible PWM rectifier 102 rectifies the DC to three-phase alternating current (AC) and inputs the three-phase AC to the motor coil 103 to drive the motor to operate.

When the energy conversion device operates in the DC discharging mode, the first end and the second end of the one-way conduction module 104 are respectively the input terminal and the output terminal. A DC discharging circuit is formed by the external battery 101, the energy conversion device, and the external DC port 105, the external DC port 105 is connected with the DC electric device, and the DC discharging circuit provides DC power for the DC electric device.

For the second implementation, the energy conversion device may operate in a driving mode and a DC charging mode.

When the energy conversion device operates in the driving mode, a driving circuit is formed by the external battery 101 with the reversible PWM rectifier 102 and the motor coil 103. The external battery 101 provides DC to the reversible PWM rectifier 102, and the reversible PWM rectifier 102 rectifies the DC to three-phase AC and inputs the three-phase AC to the motor coil 103 to drive the motor to operate.

When the energy conversion device operates in the DC charging mode, the first end and the second end of the one-way conduction module 104 are respectively the output terminal and the input terminal. A DC charging circuit is formed by the external DC port 105, the energy conversion device, and the external battery 101. The external DC port 105 is connected with a DC power supply device and provides DC power for the DC charging circuit.

The technical effects of the energy conversion device according to the embodiments of the present invention are as follows. The DC charging circuit or the DC discharging circuit is formed by the external DC port 105, the reversible PWM rectifier 102, the motor coil 103, the one-way conduction module 104, the capacitor 110, and the external battery 101, so that the energy conversion device operates in the driving mode and the DC charging mode or driving mode and the DC discharging mode. During the operation in the driving mode, a driving circuit is formed by the external battery 101 with the reversible PWM rectifier 102 and the motor coil 103. During the operation in the DC charging mode, the DC charging circuit is formed by the external DC port 105, the reversible PWM rectifier 102, the motor coil 103, the one-way conduction module 104, the capacitor 110, and the external battery 101. During the operation in the discharging mode, the DC discharging circuit is formed by the external battery 101, the reversible PWM rectifier 102, the motor coil 103, the one-way conduction module 104, the capacitor 110, and the external DC port 105. Performing discharging through the DC discharging circuit realizes discharging of the electric device when the power of the external battery 101 is relatively high, or performing charging through the DC charging circuit realizes receiving of charging from the power supply device when the power of the external battery 101 is insufficient. In addition, the reversible PWM rectifier 102, the motor coil 103, and the charging port capacitor 110 are all used in the DC charging and discharging circuit and the DC boosting charging and discharging circuit, thereby implementing the function of DC charging and discharging by using a simple circuit structure.

Figure 3:
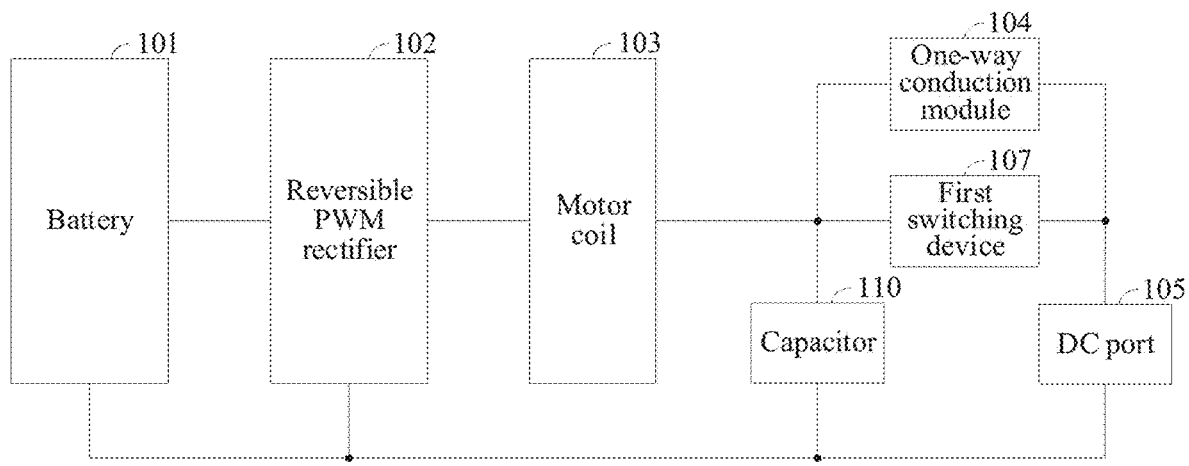
FIG. 3 is another schematic structural diagram of an energy conversion device according to Embodiment I of the present disclosure.
Figure 10:
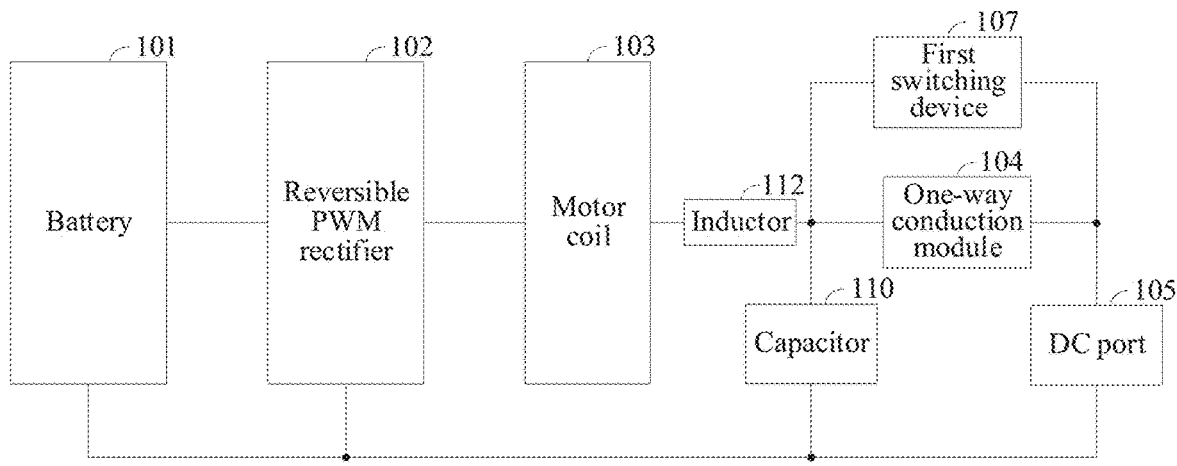
FIG. 10 is another schematic structural diagram of an energy conversion device according to Embodiment I of the present disclosure.

In an implementation, as shown in the embodiments of FIG. 3 and FIG. 10, the energy conversion device includes a first switching device 107, and the first switching device 107 is connected in parallel with the one-way conduction module 104. A first DC discharging circuit is formed by the external battery 101 with the reversible PWM rectifier 102, the motor coil 103, and the first switching device 107 in the energy conversion device, and the external DC port 105. A second DC discharging circuit is formed by the external battery 101 with the reversible PWM rectifier 102, the motor coil 103, and the one-way conduction module 104 in the energy conversion device, and the external DC port 105. The energy conversion device selects, according to an external control signal, the first DC discharging circuit or the second DC discharging circuit to operate.

In the DC discharging mode, the first DC discharging circuit is formed by the external battery 101 with the reversible PWM rectifier 102, the motor coil 103, and the first switching device 107 in the energy conversion device, and the external DC port 105. In the above discharging mode, the external DC port 105 is connected with the DC electric device, and the external battery 101 provides DC power for the DC electric device through the first DC discharging circuit. A first DC discharging energy storage circuit is formed by the external battery 101, the reversible PWM rectifier 102, the motor coil 103, the first switching device 107, and the DC electric device connected with the external DC port 105. A first DC discharging energy storage release circuit is formed by the reversible PWM rectifier 102, the motor coil 103, the first switching device 107, and the DC electric device connected with the external DC port 105. The first DC discharging circuit includes the first DC discharging energy storage circuit and the first DC discharging energy storage release circuit. During the operation of the first DC discharging energy storage circuit, the external battery 101 outputs electric energy to the first DC discharging energy storage circuit and stores the electric energy in the motor coil 103, and during the operation of the first DC discharging energy storage release circuit, the motor coil 103 discharges the DC electric device through the first DC discharging energy storage release circuit, thereby implementing the process of discharging the DC electric device by the external battery 101 through the first DC discharging circuit.

In the DC discharging mode, the one-way conduction module 104 includes a diode, and an anode and a cathode of the diode are respectively the first end and the second end of the one-way conduction module 104. The second DC discharging circuit is formed by the external battery 101 with the reversible PWM rectifier 102, the motor coil 103, and the diode in the energy conversion device, and the external DC port 105. In the above discharging mode, the external DC port 105 is connected with the DC electric device, and the external battery 101 provides DC power for the DC electric device through the second DC discharging circuit. A second DC discharging energy storage circuit is formed by the external battery 101, the reversible PWM rectifier 102, the motor coil 103, the diode, and the DC electric device connected with the external DC port 105. A second DC discharging energy storage release circuit is formed by the reversible PWM rectifier 102, the motor coil 103, the diode, and the DC electric device connected with the external DC port 105. The second DC discharging circuit includes the second DC discharging energy storage circuit and the second DC discharging energy storage release circuit. During the operation of the second DC discharging energy storage circuit, the external battery 101 outputs electric energy to the second DC discharging energy storage circuit and stores the electric energy in the motor coil 103, and during the operation of the second DC discharging energy storage release circuit, the motor coil 103 discharges the DC electric device through the second DC discharging energy storage release circuit, thereby implementing the process of discharging the DC electric device by the external battery 101 through the second DC discharging circuit.

The technical effects of the implementations of the present disclosure are as follows. The first DC discharging circuit is formed by the external battery 101 with the reversible PWM rectifier 102, the motor coil 103, and the first switching device 107 in the energy conversion device, and the DC electric device connected with the external DC port 105. The second DC discharging circuit is formed by the external battery 101 with the reversible PWM rectifier 102, the motor coil 103, and the one-way conduction module 104 in the energy conversion device, and the DC electric device connected with the external DC port 105. In this way, the energy conversion device operates in the driving mode and the discharging mode in a time-sharing manner. Performing discharging externally by using the first DC discharging circuit and the second DC discharging circuit implements discharging on the DC electric device when the power of the external battery 101 is sufficient. The motor coil 103 and the reversible PWM rectifier 102 are both used in the driving circuit and the DC discharging circuit, which not only simplifies the circuit structure, but also improves the integration level, thereby reducing the volume and costs, and resolving the problems of a complex structure, a low integration level, a large volume, and high costs of the existing control circuit. According to the implementation of the present disclosure, the motor coil 103 and the capacitor 110 are disposed in the energy conversion device to form an LC resonance module to form an LC oscillation. When the external DC port 105 is connected with the DC electric device, the external battery 101 can boost and discharge the electric device through the resonance circuit, so as to implement the discharging within a wide voltage range.

Figure 4:
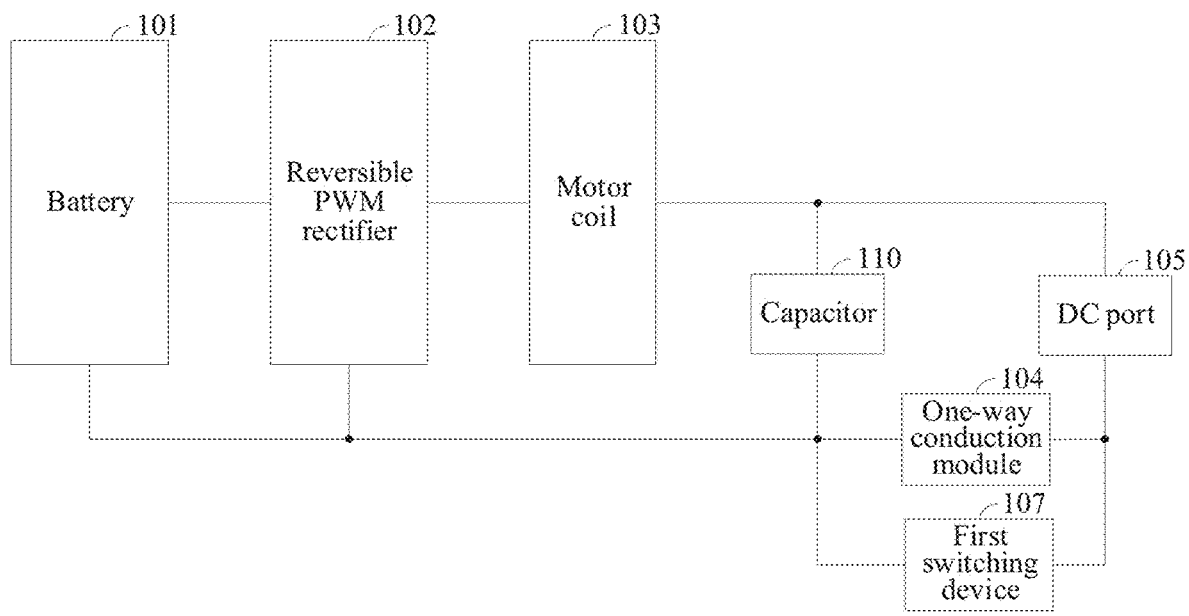
FIG. 4 is another schematic structural diagram of an energy conversion device according to Embodiment I of the present disclosure.
Figure 16:
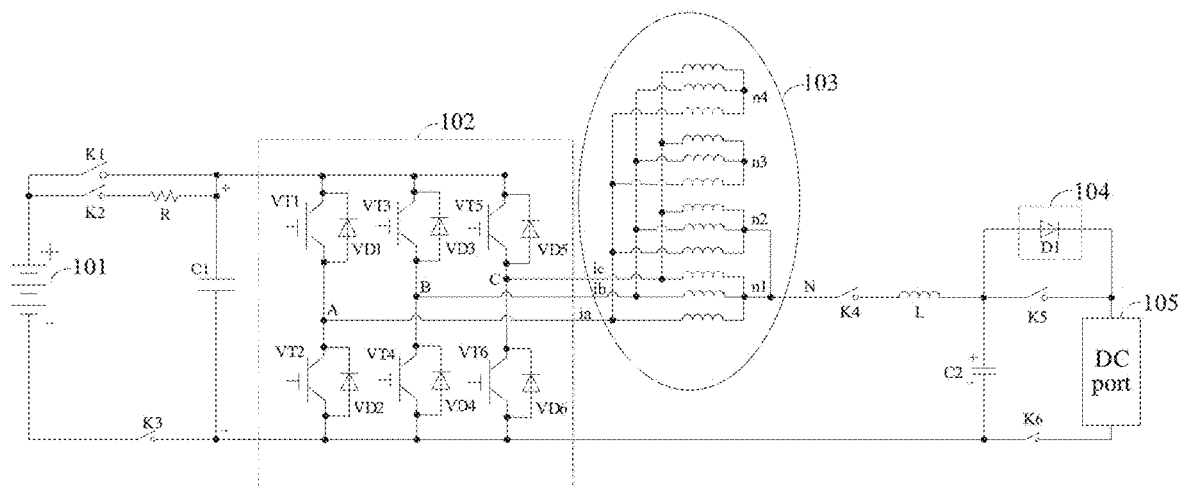
FIG. 16 is another circuit diagram of an energy conversion device according to Embodiment I of the present disclosure.

In an implementation, as shown in the embodiments of FIG. 4 and FIG. 16, the energy conversion device includes a first switching device 107, and the first switching device 107 is connected in parallel with the one-way conduction module 104. A first charging circuit is formed by the external DC port 105 with the first switching device 107, the motor coil 103, and the reversible PWM rectifier 102 in the energy conversion device, and the external battery 101.

A second DC charging circuit is formed by the external DC port 105 with the one-way conduction module 104, the motor coil 103, and the reversible PWM rectifier 102 in the energy conversion device, and the external battery 101.

The energy conversion device selects, according to an external control signal, the first DC charging circuit or the second DC charging circuit to operate.

In the DC charging mode, a first charging circuit is formed by the external DC port 105 with the first switching device 107, the motor coil 103, and the reversible PWM rectifier 102 in the energy conversion device, and the external battery 101. The external DC port 105 is connected with a DC power supply device. A first DC charging energy storage circuit is formed by the DC power supply device, the first switching device 107, the motor coil 103, and the reversible PWM rectifier 102. A first DC charging energy storage release circuit is formed by the DC power supply device, the first switching device 107, the motor coil 103, the reversible PWM rectifier 102, and the external battery 101. The DC charging circuit includes a first DC charging energy storage circuit and a first DC charging energy storage release circuit. During the operation of the first DC charging energy storage circuit, the DC power supply device stores the electric energy in the motor coil 103 by outputting the electric energy to the first DC charging energy storage circuit. During the operation of the first DC charging energy storage release circuit, the DC power supply device and the motor coil 103 together charge the external battery 101 through the first DC charging energy storage release circuit, thereby implementing the process of charging the external battery 101 through the first DC charging circuit by the DC power supply device.

A second charging circuit is formed by the external DC port 105 with the diode, the motor coil 103, and the reversible PWM rectifier 102 in the energy conversion device, and the external battery 101. The external DC port 105 is connected with a DC power supply device. A second DC charging energy storage circuit is formed by the DC power supply device, the diode, the motor coil 103, and the reversible PWM rectifier 102. A second DC charging energy storage release circuit is formed by the DC power supply device, the diode, the motor coil 103, the reversible PWM rectifier 102, and the external battery 101. The DC charging circuit includes a second DC charging energy storage circuit and a second DC charging energy storage release circuit. During the operation of the second DC charging energy storage circuit, the DC power supply device stores the electric energy in the motor coil by outputting the electric energy to the second DC charging energy storage circuit. During the operation of the second DC charging energy storage release circuit, the DC power supply device and the motor coil together charge the external battery through the second DC charging energy storage release circuit, thereby implementing the process of charging the external battery through the second DC charging circuit by the DC power supply device.

The technical effects of the implementations of the present disclosure are as follows. The first DC charging circuit is formed by the external DC port with the first switching device, the motor coil, and the reversible PWM rectifier in the energy conversion device, and the external battery. The second DC charging circuit is formed by the external DC port with the one-way conduction module, the motor coil, and the reversible PWM rectifier in the energy conversion device, and the external battery. In this way, the energy conversion device operates in the driving mode and the charging mode in a time-sharing manner. Performing charging through the first DC charging circuit and the second DC charging circuit can realize the charging by the DC power supply device when the power of the external battery is insufficient. In addition, the motor coil and the reversible PWM rectifier are both used in the driving circuit and the DC charging circuit, which not only simplifies the circuit structure, but also improves the integration level, thereby reducing the volume and costs, and resolving the problems of a complex structure, a low integration level, a large volume, and high costs of the existing control circuit. According to the implementation of the present disclosure, the motor coil and the capacitor are disposed in the energy conversion device to form an LC resonance module to form an LC oscillation. When the external DC port is connected with the DC electric device, the DC power supply device can boost and charge the external battery through the resonance circuit, so as to implement the charging within a wide voltage range.

Figure 5:
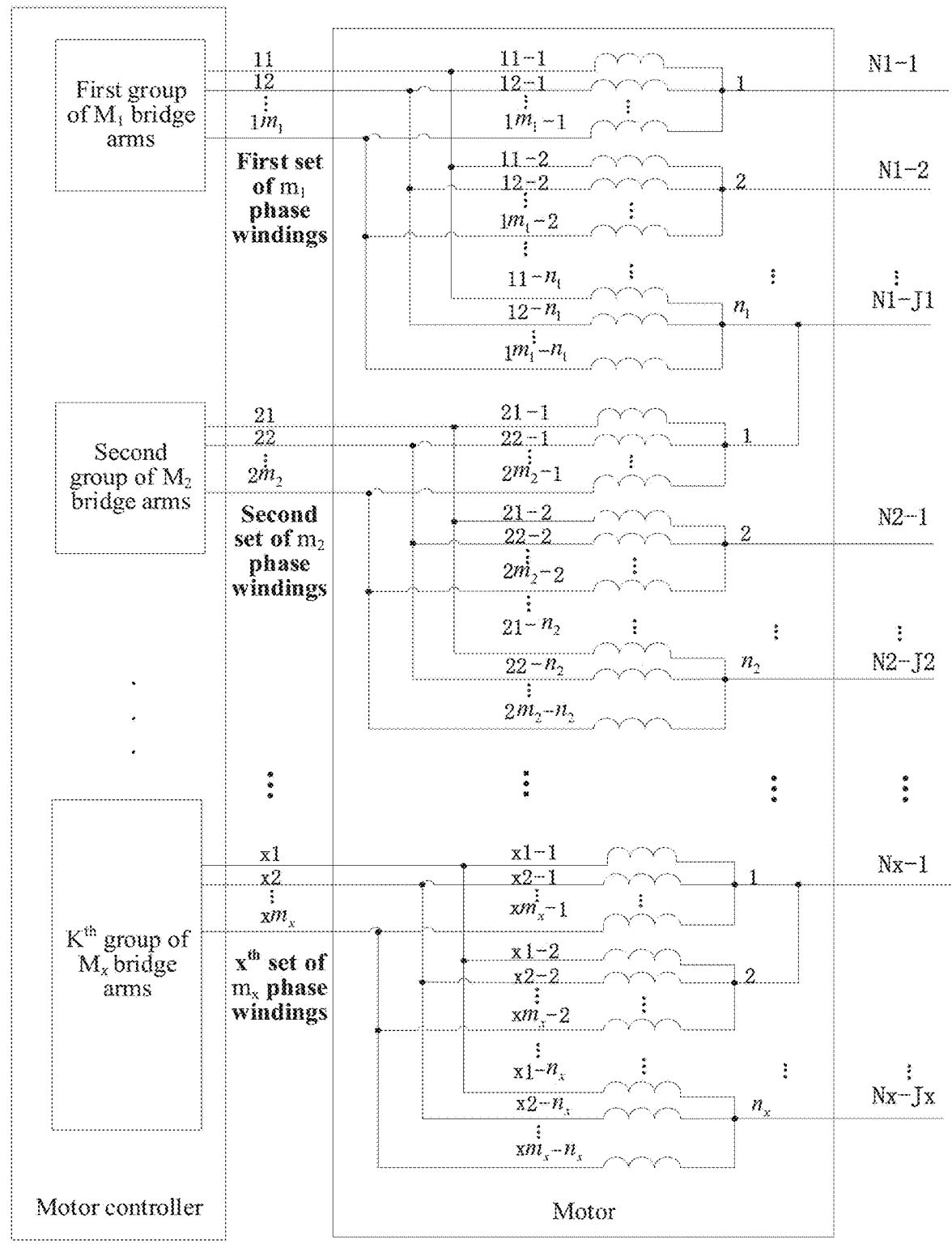
FIG. 5 is a schematic structural diagram of a motor in an energy conversion device according to Embodiment I of the present disclosure.

For the reversible PWM rectifier 102 in an implementation, as shown in FIG. 5, the motor coil 103 includes x sets of windings, wherein x≥1, and x is an integer.

A number of phases of an $x^{th}$ set of windings is $m_x$, each phase winding in the $x^{th}$ set of windings includes $n_x$ coil branches, the $n_x$ coil branches of each phase winding are connected together to form a phase endpoint, and one of the $n_x$ coil branches of each phase winding in the $x^{th}$ set of windings is further connected with one of the $n_x$ coil branches of other phase windings to form $n_x$ connection points, wherein $n_x$≥1, $m_x$≥2, and $m_x$ and $n_x$ are integers.

The x sets of windings form a total of $$\sum_{i=1}^{x} n_i$$

connection points, the $$\sum_{i=1}^{x} n_i$$

connection points form T neutral points, and N neutral lines are led out from the T neutral points.

A range of T is $$\sum_{i=1}^{x} n_i \geq T \geq 1,$$

a range of N is T≥N≥1, and T and N are both integers.

The reversible PWM rectifier 102 includes K groups of $M_x$ bridge arms, a midpoint of at least one bridge arm in one group of $M_x$ bridge arms is connected with a phase endpoint in a set of $m_x$-phase windings, and any two phase endpoints are connected with different bridge arms, wherein $M_x$≥$m_x$, K≥x, and K and $M_x$ are both integers.

As shown in FIG. 5, the motor coil includes x sets of windings, and $m_x$ phases mean that a number of phases of an $x^{th}$ set of windings is $m_x$. For example, a number of phases of a first set of windings is $m_1$, which is respectively a phase winding 11, a phase winding 12 until a phase winding $1m_1$. A number of phases of a second set of windings is $m_2$, which is respectively a phase winding 21, a phase winding 22 until a phase winding $2m_2$. The number of phases of the $x^{th}$ set of windings is $m_x$, which is respectively a phase winding x1, a phase winding x2 until the phase winding $xm_x$. Each phase winding in the x sets of windings includes $n_x$ coil branches, and the $n_x$ coil branches of each phase winding are connected together to form a phase endpoint. For example, the phase winding 11 in the first set of windings includes $n_1$ coil branches, which are respectively a phase coil branch 11-1, a phase coil branch 11-2 until a phase coil branch 11-$n_1$. The above $n_1$ coil branches are connected together to form a phase endpoint, and the phase winding 12 in the first set of windings includes $n_1$ coil branches, which are respectively a phase coil branch 12-1, a phase coil branch 12-2 until a phase coil branch 12-$n_1$. The above $n_1$ coil branches are connected together to form a phase endpoint, and the phase winding $1m_1$ in the first set of windings includes $n_1$ coil branches, which are respectively a phase coil branch $1m_1$-1, a phase coil branch $1m_1$-2 until a phase coil branch $1m_1$-$n_1$. The above $n_1$ coil branches are connected together to form a phase endpoint. The phase winding 21 in the second set of windings includes $n_2$ coil branches, which are respectively a phase coil branch 21-1, a phase coil branch 21-2 until a phase coil branch 21-$n_2$. The above $n_2$ coil branches are connected together to form a phase endpoint, and the phase winding 22 in the second set of windings includes $n_2$ coil branches, which are respectively a phase coil branch 22-1, a phase coil branch 22-2 until a phase coil branch 22-$n_2$. The above $n_2$ coil branches are connected together to form a phase endpoint, and the phase winding $2m_2$ in the second set of windings includes $n_2$ coil branches, which are respectively a phase coil branch $2m_2$-1, a phase coil branch $2m_2$-2 until a phase coil branch $2m_2$-$n_2$. The above $n_2$ coil branches are connected together to form a phase endpoint. The phase winding x1 in the $x^{th}$ set of windings includes $n_x$ coil branches, which are respectively a phase coil branch x1-1, a phase coil branch x1-2 until a phase coil branch x1-$n_x$. The above $n_x$ coil branches are connected together to form a phase endpoint, and the phase winding x2 in the $x^{th}$ set of windings includes $n_x$ coil branches, which are respectively a phase coil branch x2-1, a phase coil branch x2-2 until a phase coil branch x2-$n_x$. The above $n_x$ coil branches are connected together to form a phase endpoint, and the phase winding $xm_x$ in the $x^{th}$ set of windings includes $n_x$ coil branches, which are respectively a phase coil branch $xm_x$-1, a phase coil branch $xm_x$-2 until a phase coil branch $xm_x$-$n_x$. The above $n_x$ coil branches are connected together to form a phase endpoint.

$n_x$ connection points mean that the number of connection points formed by $n_x$ coil branches of the $x^{th}$ set of windings is $n_x$. A coil branch of one phase winding in each set of windings is further connected with a coil branch of other phase windings to form a connection point. Generally, one coil branch is connected with one connection point. For example, the phase coil branch 11-1 in the phase winding 11 in the first set of windings, the phase coil branch 12-1 in the phase winding 12, and the phase coil branches $1m_1$-1 in the phase winding $1m_1$ are connected together to form a first connection point, and so on. The remaining branches in the first set of windings respectively form a second connection point until the $n_1^{th}$ connection point, the first set of windings form a total of $n_1$ connection points, the second set of windings form a total of $n_2$ connection points until the $x^{th}$ set of windings form a total of $n_x$ connection points, and x sets of windings form a total of $(n_1+n_2+ \ldots +n_x)$ connection points. The neutral point is formed by the connection point. One neutral point may be formed by one connection point, or two or more connection points are connected together to form one neutral point. The neutral point is used for leading out the neutral line, and a neutral line may be led out or no neutral line is led out from the neutral point. One neutral line led out from the neutral point may also include a plurality of branches, and the neutral line is configured to connect the motor to other modules.

The $m_x$ phase windings of each set may be used as a basic unit, and the motor is independently operated by controlling each basic unit by conventional motor vector control. The motor is operated by controlling each set of $m_x$-phase windings by motor vector control.

The technical effects of the embodiments of the present invention are as follows. x sets of windings are disposed in the motor. A number of phases of the $x^{th}$ set of windings is $m_x$, and each phase winding in the $x^{th}$ set of windings includes $n_x$ coil branches, and $n_x$ coil branches of each phase winding are connected together to form a phase endpoint. One of the $n_x$ coil branches of each phase winding in the $x^{th}$ set of windings is further connected with one of the $n_x$ coil branches of other phase windings to form $n_x$ connection points. The x sets of windings form a total of $$\sum_{i=1}^{x} n_i$$

connection points, $$\sum_{i=1}^{x} n_i$$

connection points form T neutral points, and N neutral lines are led out from the T neutral points. The neutral line is led out from the neutral point formed by the connection points with different quantities in parallel, so that the equivalent phase inductance of the motor is different, and the capabilities of passing currents through the neutral points of the motor are different. According to the requirements for charging power and inductance, a proper number of connection points in parallel are selected to form the neutral point from which the neutral line is led out, so as to obtain the required charging power and inductance, thereby improving the charging and discharging performance while satisfying the charging power. When one neutral line is led out, as an output terminal of the motor, from the neutral point formed by one of the connection points of the motor, the equivalent inductance of the motor is the largest, the ripple on the inductance is the smallest, the capacity for carrying current is the smallest, the resistance of the current circuit is relatively large, and the circuit loss is large. When one neutral line is led out, as the output terminal of the motor, from the neutral point formed by the plurality of connection points of the motor, the capacity for carrying current of the motor can be increased, which is suitable for high-power charging. Multi-wire parallel connection can reduce the resistance of the current circuit, and the circuit loss is small. When the neutral line is led out, as the output terminal of the motor, from the neutral point formed by one of the connection points of the motor and the neutral point formed by plurality of connection points, the service life of the motor winding coil can be balanced, a plurality of equivalent inductances are provided, and the requirements for different charging power can be satisfied.

In an implementation, when K=1, x=1, and $M_1 \geq m_1 \geq 2$, the reversible PWM rectifier 102 includes a group of $M_1$ bridge arms, and the motor coil includes a set of $m_1$-phase windings. Each phase winding includes $n_1$ coil branches and forms $n_1$ connection points, and at least one neutral line is led out from the neutral point formed by the $n_1$ connection points, wherein $n_1 \geq 1$.

Further, when K=1, x=1, and $M_1=m_1=3$, the reversible PWM rectifier 102 includes a group of three bridge arms, and the motor coil includes a set of three phase windings. Each phase winding includes $n_1$ coil branches and forms $n_1$ connection points, and at least one neutral line is led out from the neutral point formed by the $n_1$ connection points, wherein $n_1 \geq 1$.

Figure 6:
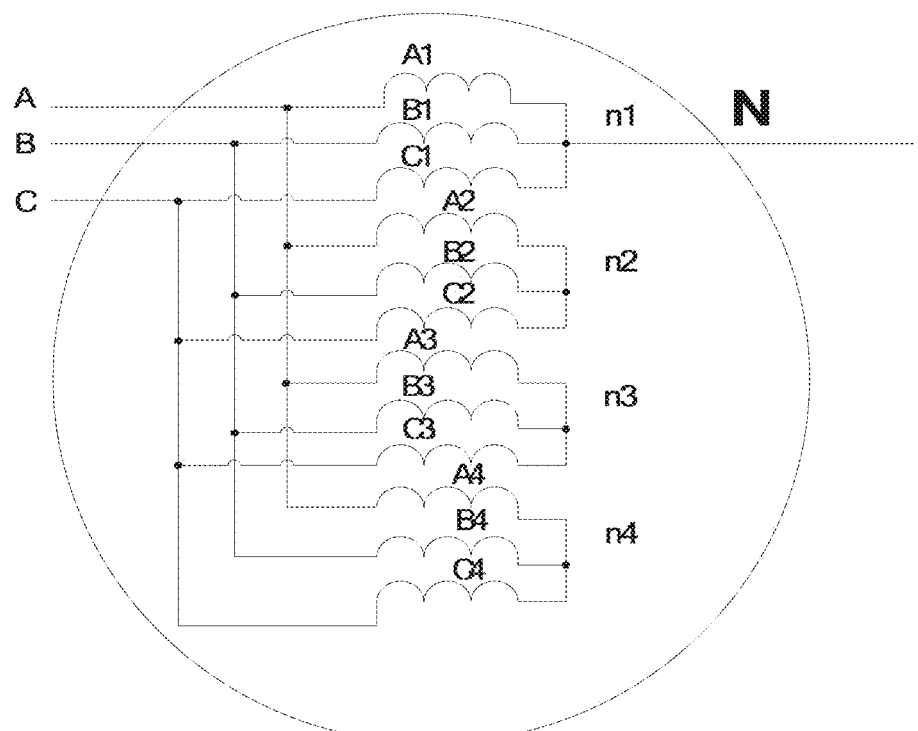
FIG. 6 is another schematic structural diagram of a motor in an energy conversion device according to Embodiment I of the present disclosure.

As shown in FIG. 6, each phase winding includes four coil branches, and forms four connection points. One neutral line is led out from the neutral point formed by one of the connection points.

The three phase windings are a phase A winding, a phase B winding, and a phase C winding. The phase A winding includes a phase A1 coil, a phase A2 coil, a phase A3 coil, and a phase A4 coil. The phase B winding includes a phase B1 coil, a phase B2 coil, a phase B3 coil, and a phase B4 coil. The phase C winding includes a phase C1 coil, a phase C2 coil, a phase C3 coil, and a phase C4 coil. A first common end is formed by a first end of the phase A1 coil, the phase A2 coil, the phase A3 coil, and the phase A4 coil, a second common end is formed by a first end of the phase B1 coil, the phase B2 coil, the phase B3 coil, and the phase B4 coil, and a third common end is formed by a first end of the phase C1 coil, the phase C2 coil, the phase C3 coil, and the phase C4 coil. A connection point n1 is formed by the phase A1 coil, the phase B1 coil, and the phase C1 coil in the first three-phase coils, a connection point n2 is formed by the phase A2 coil, the phase B2 coil, and the phase C2 coil in the second three-phase coils, a connection point n3 is formed by the phase A3 coil, the phase B3 coil, and the phase C3 coil in the third three-phase coils, and a connection point n4 is formed by the phase A4 coil, the phase B4 coil, and the phase C4 coil in the fourth three-phase coils. A neutral point is formed by the connection point n1, and one neutral line is led out from the neutral point.

Figure 7:
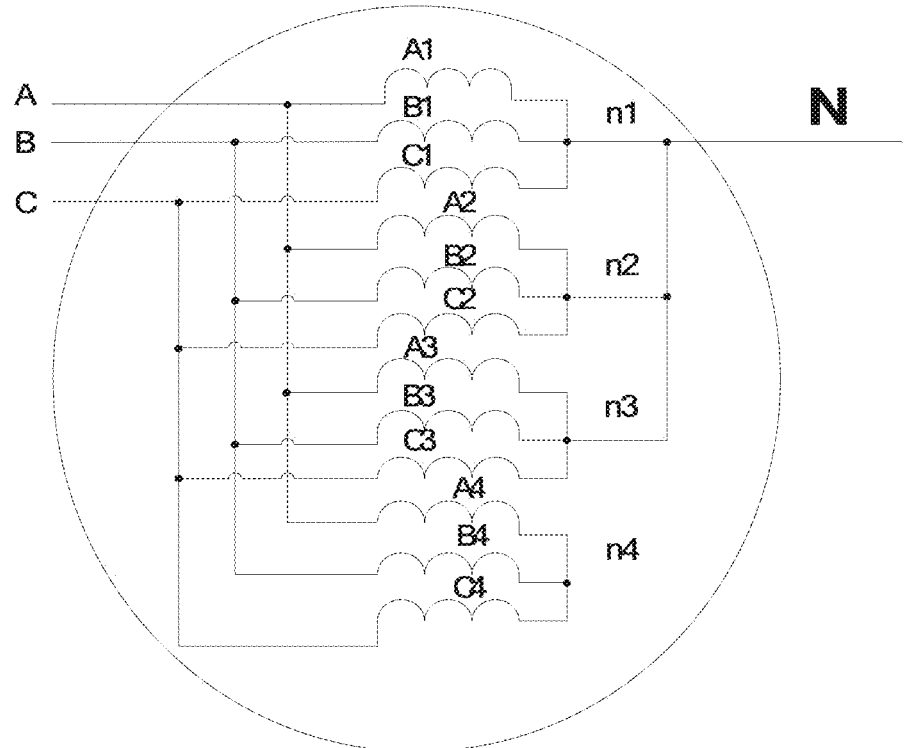
FIG. 7 is another schematic structural diagram of a motor in an energy conversion device according to Embodiment I of the present disclosure.

As shown in FIG. 7, each phase winding includes four coil branches, and four connection points are formed. One neutral line is led out from neutral point formed by connecting the three connection points.

One neutral line is led out from the neutral point formed by connecting the connection point n1, the connection point n2, and the connection point n3.

The technical effects of this implementation are as follows. A plurality of connection points are connected together to form a neutral point from which one neutral line is led out, and the neutral point having different quantities of connection points in parallel is set, so that the equivalent phase inductance of the motor and the current flowing through the motor are different. A number of poles led out from the motor coil 103 is estimated by setting the connection mode between the bridge arm in the reversible PWM rectifier 102 and the coil in the motor, and the required charging power and inductance can be obtained, so as to improve the charging and discharging performance while satisfying the charging power.

Figure 8:
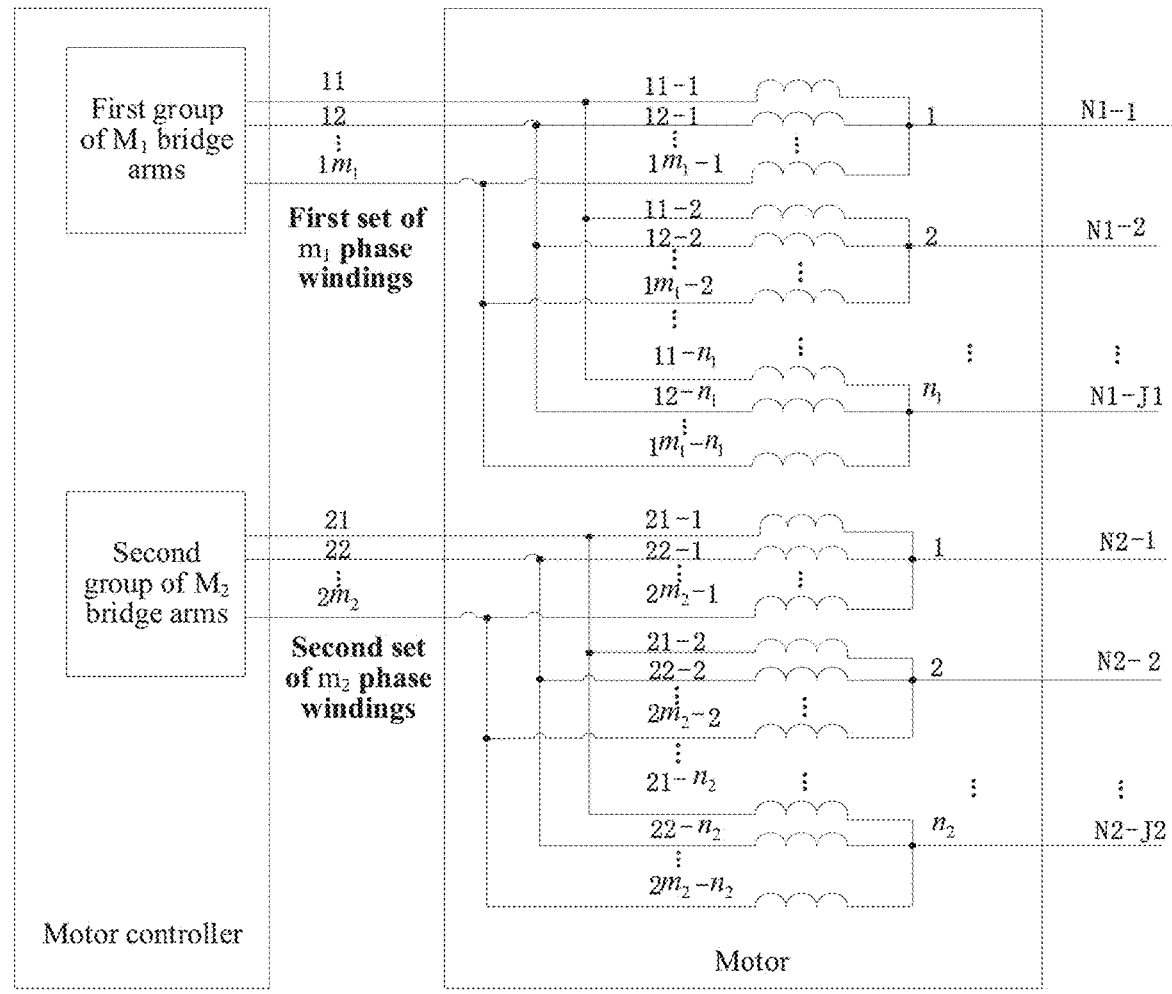
FIG. 8 is another schematic structural diagram of a motor in an energy conversion device according to Embodiment I of the present disclosure.

In an implementation, as shown in FIG. 8, the reversible PWM rectifier 102 includes K sets of $M_1$ bridge arms, wherein K≥1, and K is an integer.

The motor coil 103 includes a first winding unit and a second winding unit. The first winding unit includes a set of $m_1$-phase windings, and each of the $m_1$-phase windings includes $n_1$ coil branches. The $n_1$ coil branches of each phase winding are connected together to form a phase endpoint, and the phase endpoints of the $m_1$-phase windings are connected in a one-to-one correspondence with a midpoint of each of $m_1$ bridge arms of the $M_1$ bridge arms. One of the $n_1$ coil branches of each of $m_1$-phase windings is further connected with one of the $n_1$ coil branches of other phase windings to form $n_1$ connection points, the $n_1$ connection points form $T_1$ neutral points, and at least one neutral line is led out from the $T_1$ neutral points, wherein $n_1$≥1, $m_1$≥1, $T_1$≥1, and $n_1$, $m_1$, $T_1$ are all integers.

The second winding unit includes a set of $m_2$-phase windings, each of the $m_2$-phase windings includes $n_2$ coil branches, and the $n_2$ coil branches of each phase winding are connected together to form a phase endpoint. The phase endpoints of the $m_2$-phase winding are connected in a one-to-one correspondence with a midpoint of each of $m_2$ bridge arms of the $M_1$ bridge arms, one of the $n_2$ coil branches of each of $m_2$-phase windings is further connected with one of the $n_2$ coil branches of other phase windings to form $n_2$ connection points, the $n_2$ connection points form $T_2$ neutral points, and at least one neutral line is led out from the $T_2$ neutral points, wherein $n_2$≥1, $m_2$≥1, $M_1$≥$m_1$+$m_2$, $T_2$≥1, and $n_1$, $m_1$, $M_1$, and $T_2$ are all integers.

Further, when $m_1$=$m_2$=3, $M_1$=6, and $n_1$=2, the first winding unit forms two connection points. One of the connection points forms a neutral point and a first neutral line is led out from the neutral point, the second winding unit forms two connection points, and one of the connection points forms a neutral point and a second neutral line is led out from the neutral point.

Further, when $m_1$=$m_2$=3, $M_1$=6, and $n_1$=2, the first winding unit forms two connection points, the two connection points are connected together to form a neutral point and a first neutral line is led out from the neutral point, the second winding unit forms two connection points, and the two connection points form a neutral point and a second neutral line is led out from the neutral point.

The power switch control mode for the reversible PWM rectifier 102 may be any one or a combination of the following. For example, at least one bridge arm control in the inverter is selected, which is flexible and simple.

The synchronous control method of the controller bridge arm such as synchronous turning-on and synchronous turning-off is preferably selected, so that the motor current increases when turned on and decreases when turned off. It is beneficial for the motor current to tend to be equal at any instant, so that the combined magnetomotive force of the motor tends to be zero, the stator magnetic field tends to be zero, and the motor basically produces no torque. When the inductance of the motor itself does not meet the ripple requirements, staggered phase control of the controller may be adopted for control, and the staggered angle=360/a number of phases of the motor. For example, three phases are staggered by the phase control of about 120°. In this way, positive and negative ripples of the three-phase coils are superimposed on each other to cancel each other, so that the total ripple may be greatly reduced. For example, two phases are staggered by the phase control of about 180°. In this way, positive and negative ripples of the two-phase coils are superimposed on each other to cancel each other, so that the total ripple may be greatly reduced.

When the reversible PWM rectifier 102 includes three-phase bridge arms, the control mode for the three-phase bridge arms may be any one or a combination of the following. For example, any bridge arm or any two bridge arms in the phase A, phase B, and phase C may be realized, and three bridge arms have a total of 7 controlled heating methods, which is flexible and simple. The switching of the bridge arms can be beneficial to realize choices of large, medium, and small heating power. 1. Any phase bridge arm power switch may be selected for control, and the three-phase bridge arms may be switched in turn. For example, the phase A bridge arm first operates alone and controls a first power switch unit and a second power switch unit to perform heating for a period of time, then the phase B bridge arm operates alone and controls a third power switch unit and a fourth power switch unit to perform heating for the same period of time, then the phase C bridge arm operates alone and controls a fifth power switch unit and a sixth power switch unit to perform heating for the same period of time, and then the phase C bridge arm is switched to the phase A bridge arm to operate. In this cycle, the three-phase inverter and the three-phase coils are alternately energized and heated. 2. Any two-phase bridge arm power switch may be selected for control, and the three-phase bridge arms may be switched in turn. For example, the phase A bridge arm and the phase B bridge arm operate first to control the first power switch unit, the second power switch unit, the third power switch unit, and the fourth power switch unit to perform heating for a period of time, then the phase B bridge arm and the phase C bridge arm operate to control the third power switch unit, the fourth power switch unit, the fifth power switch unit, and the sixth power switch unit to perform heating for the same period of time, and then the phase C bridge arm and the phase A bridge arm operate to control the fifth power switch unit, the second power switch unit, the first power switch unit, and the sixth power switch unit to perform heating for the same period of time. Then the phase A bridge arm and the phase B bridge arm operate. By means of the cycle, the three-phase inverter is implemented. 3. Preferably, the three-phase bridge arm power switch may be selected for simultaneous control, that is, the three-phase upper bridge arms are simultaneously turned on, and the three-phase lower bridge arms are simultaneously turned off, the three-phase upper bridge arms are simultaneously turned off, and the three-phase lower bridge arms are simultaneously turned on. At this point, the three-phase power bridge arm is equivalent to a single DC/DC, and because the three-phase circuit is theoretically balanced, the three-phase current is balanced. In this way, the three-phase inverter and the three-phase coils are heated evenly, and the three-phase current is basically DC. The average value is basically the same, and due to the symmetry of the three phase windings, the three-phase composite magnetomotive force inside the motor is basically zero at this point, the stator magnetic field is basically zero, and the motor produces basically no torque, which is conducive to greatly reducing the stress of the transmission system.

In an implementation, the energy conversion device includes an inductor. One end of the inductor is connected with the neutral line, and another end of the inductor is connected with a first end of the one-way conduction module 104 and a first end of the capacitor 110.

Figure 9:
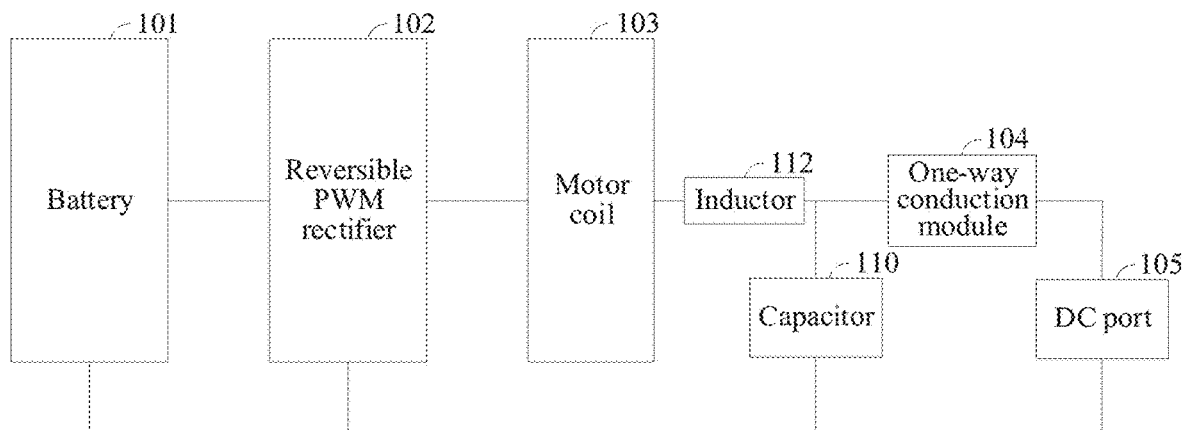
FIG. 9 is another schematic structural diagram of an energy conversion device according to Embodiment I of the present disclosure.

As shown in FIG. 9, when the external DC port 105 is connected with the DC electric device, a third discharging circuit is formed by the external battery 101, the reversible PWM rectifier 102, the motor coil 103, an inductor 112, the capacitor 110, the one-way conduction module 104, and the DC electric device.

The energy conversion device causes, according to an external control signal, the third discharging circuit to periodically operate in a first operating stage, a second operating stage, and a third operating stage.

In the first operating stage, electric energy of the external battery 101 passes through the reversible PWM rectifier 102, the motor coil 103, the inductor 112, and the capacitor 110 and then flows back to the external battery 101.

In the second operating stage, a loop current is formed by the motor coil 103, the inductor 112, the capacitor 110, and the reversible PWM rectifier 102, and electric energy outputted by the motor coil 103 and the inductor 112 passes through the one-way conduction module 104, the DC electric device, and the reversible PWM rectifier 102 and then flows back to the motor coil 103.

In the third operating stage, the electric energy outputted by the capacitor 110 passes through the motor coil 103 and the reversible PWM rectifier 102 and then flows back to the capacitor 110.

The difference between the implementation of the present invention and the above implementation is as follows. The energy conversion device further includes the inductor 112. The inductor 112 and the capacitor 110 form an LC resonance module. The capacitor 110 may include a plurality of capacitors, and the capacitors are connected in series with the inductor. The inductor 112 and the capacitor 110 are connected in series to achieve the LC oscillation. For example, the voltage of the capacitor 110 gradually increases within a period of time, while the current of the inductor 112 gradually decreases. Within another period of time, the voltage of the capacitor 110 gradually decreases, while the current of the inductor 112 gradually increases, thereby implementing the energy storage in the inductor 112 or the capacitor 110.

In the embodiment of the present disclosure, an LC resonance module is disposed in the energy conversion device, so that a resonance circuit is formed by the LC resonance module and the power battery 101 module, the reversible PWM rectifier 102, the motor coil 103, the one-way conduction module 104, and the external DC port 105. The LC resonance module includes an inductor 112 and a capacitor 110 module, and forms an LC oscillation by using the motor coil 103, the inductor 112, and the capacitor 110 module in the resonance circuit. When the external DC port 105 is connected with the DC electric device, the external battery 101 can boost and discharge the DC electric device through the resonance circuit.

In an implementation, when the external DC port 105 is connected with the DC electric device, a fourth discharging circuit is formed by the external battery 101 with the reversible PWM rectifier 102, the motor coil 103, the capacitor 110, and the one-way conduction module 104 in the energy conversion device, and the DC electric device.

The energy conversion device causes, according to an external control signal, the fourth discharging circuit to periodically operate in a first operating stage, a second operating stage, and a third operating stage.

In the first operating stage, electric energy of the external battery 101 passes through the reversible PWM rectifier 102, the motor coil 103, and the capacitor 110 and then flows back to the external battery 101.

In the second operating stage, a loop current is formed by the motor coil 103, the capacitor 110, and the reversible PWM rectifier 102, and electric energy outputted by the motor coil 103 passes through the one-way conduction module 104, the DC electric device, and the reversible PWM rectifier 102 and then flows back to the motor coil 103.

In the third operating stage, the electric energy outputted by the capacitor 110 passes through the motor coil 103 and the reversible PWM rectifier 102 and then flows back to the capacitor 110.

The difference between this implementation and the above-mentioned implementations is that the motor coil 103 and the capacitor 110 form an LC resonance module, and the motor coil 103 and the capacitor 110 module in the resonance circuit form an LC oscillation. When the external DC port 105 is connected with the electric device, the external battery 101 may boost and discharge the DC electric device through the resonance circuit.

In an implementation, as shown in FIG. 10, the energy conversion device includes a first switching device 107 and an inductor 112. The inductor 112 is connected between the motor coil 103 and the capacitor 110, and the first switching device 107 is connected in parallel with the one-way conduction module 104.

When the external DC port 105 is connected with the DC electric device, a fifth discharging circuit is formed by the external battery 101 with the reversible PWM rectifier 102, the motor coil 103, the inductor 112, the capacitor 110, and the first switching device 107 in the energy conversion device, and the DC electric device.

The energy conversion device causes, according to an external control signal, the fifth discharging circuit to periodically operate in a first operating stage and a second operating stage.

In the first operating stage, electric energy of the external battery 101 passes through the reversible PWM rectifier 102, the motor coil 103, the inductor 112, the capacitor 110, and the DC electric device and then flows back to the external battery 101.

In the second operating stage, the electric energy outputted by the motor coil 103 and the inductor passes through the inductor 112, the first switching device 107, the DC electric device, and the reversible PWM rectifier 102 and then flows back to the motor coil 103.

According to this implementation, in the first operating stage, the electric energy of the external battery 101 stores energy in the motor coil 103 and the inductor 112 through the reversible PWM rectifier 102, the motor coil 103, the capacitor 110, and the DC electric device. In the second operating stage, the electrical energy outputted by the motor coil 103 and the inductor 112 passes through the first switching device 107, the DC electric device, and the reversible PWM rectifier 102 to perform energy storage release on the DC electric device. The discharge of the DC electric device is implemented by alternating the first operating stage and the second operating stage.

In an implementation, a first switching module and a first energy storage module are disposed between the external battery 101 and the energy conversion device. A positive electrode end of the battery 101 is connected with a first end of the first switching module, and a negative electrode end of the battery 101 is connected with a second end of the first switching module. A third end of the first switching module is connected with a first end of the first energy storage module, and a fourth end of the first switching module is connected with a second end of the first energy storage module.

The first switching module is located between the battery 101 and the first energy storage module, and the first switching module may connect the battery 101 with the first energy storage module or disconnect the battery from the first energy storage module according to the control signal, so that the battery 101 can be connected with or disconnected from the reversible PWM rectifier 102. The first energy storage module may be an energy storage device such as a capacitor 110. When the first switching module is turned on, the battery 101 pre-charges the first energy storage module by using the first switching module until the first energy storage module is fully charged.

The technical effects of this implementation are as follows. The first switching module is disposed between the external battery 101 and the energy conversion device, and the battery 101 can be connected with or disconnected from other modules of the energy conversion device by controlling the first switching module. By disposing the first energy storage module, the first energy storage module is connected in parallel with the battery 101 by using the first switching module, which may play a filtering role. Since the first energy storage module has the function of charging and discharging, when the voltage of the battery 101 fluctuates, the charging and discharging of the first energy storage module may reduce the fluctuation of the voltage of the power battery 101.

For the first switching module, in a first implementation, the first switching module includes a first switch and a third switch. A first end of the first switch is the first end of the first switching module, and a second end of the first switch is the third end of the first switching module. A first end of the third switch is the second end of the first switching module, and a second end of the third switch is the fourth end of the first switching module.

The technical effects of this implementation are as follows. Two switches, that is, the first switch and the third switch, are disposed in the first switching module. By controlling the first switch and the third switch, the battery 101 can charge the first energy storage module, and the battery 101 may be controlled to be connected with or disconnected from other modules of the energy conversion device.

For the first switching module, in a second implementation, the first switching module includes only the first switch or the third switch described above.

Compared with the afore-mentioned first implementation, one switch is reduced in this implementation. Since the first switch and the third switch are connected between the battery 101 and the first energy storage module in the above implementation, the same function may also be implemented by using one switch.

The technical effects of this implementation are as follows. One switch is further disposed in the first switching module to simplify the circuit structure.

For the first switching module, in a third implementation, the first switching module includes a first switch, a second switch, a resistor, and a third switch. A first end of the first switch is connected with a first end of the second switch, so as to form the first end of the first switching module. A second end of the second switch is connected with a first end of the resistor, and a second end of the resistor is connected with a second end of the first switch, so as to form the third end of the first switching module. A first end of the third switch is the second end of the first switching module, and a second end of the third switch is the fourth end of the first switching module.

Compared with the first implementation, a branch is added in this implementation. A second switch and a resistor are disposed on the branch. The branch is configured to pre-charge the first energy storage module by the battery 101. That is, when the second switch is first turned on to cause the battery 101 to charge the first energy storage module, a magnitude of the pre-charging current may be controlled due to the disposed resistor, and the second switch is controlled to be turned off and the first switch is controlled to be turned on upon completion of the pre-charging.

The technical effects of this implementation are as follows. A branch for pre-charging is disposed in the first switching module, so as to implement the control on the charging current outputted to the first energy storage module by the battery 101, thereby improving the charging safety of the rechargeable battery 101 and the first energy storage module during the charging.

For the DC port 105, in an implementation, a second energy storage device and a second switching module are disposed between the DC port 105 and the energy conversion device. A first end of the second energy storage device is connected together with a first end of the second switching module, and a second end of the second energy storage device is connected together with a second end of the second switching module. A third end of the second switching module is connected with a first end of the DC port 105, and a fourth end of the second switching module is connected with a second end of the DC port 105.

The second switching module includes a fifth switch and a sixth switch. A first end and a second end of the fifth switch are respectively the first end and the fourth end of the second switching module. A first end and a second end of the sixth switch are respectively the second end and the third end of the second switching module. The external DC port 105 is connected with the DC electric device or the DC charging device, and the fifth switch and the sixth switch are controlled, so that the energy conversion device discharges the DC electric device or receives charging from the DC charging device.

The technical effects of this implementation are as follows. The energy storage module is disposed, so that the energy conversion device is connected with the DC electric device to detect whether the DC electric device satisfies the discharging condition and discharge the DC electric device, and the energy conversion device is connected with the DC charging device to detect whether the DC power device satisfies the charging condition and receive the charging from the DC charging device. In addition, when the energy conversion device starts charging or discharging, electric energy may be stored to assist the completion of the interaction process, and during the charging or discharging of the energy conversion device, the current passing the motor on the N line is filtered to further reduce the current ripple.

For the one-way conduction module 104, in an implementation, the one-way conduction module 104 includes a diode.

In this implementation, the diode is disposed. When a voltage at an input of the diode is greater than a voltage at an output, the energy conversion device may charge the electric device by using the diode. In particular, when the voltage of the external battery 101 is less than the voltage of the electric device, the external battery 101 is boosted by using the reversible PWM rectifier 102 and the motor, and then the electric device is discharged by using the diode.

In an implementation, the energy conversion device further includes a third switching module. The third switching module is connected between the motor coil 103 and the external DC port 105.

The third switching module includes a fourth switch, and the fourth switch is configured to implement connecting or disconnecting between the motor coil 103 and the external DC port 105.

The technical solutions of the embodiments of the disclosure are specifically described below by using a specific circuit structure below.

Figure 11:
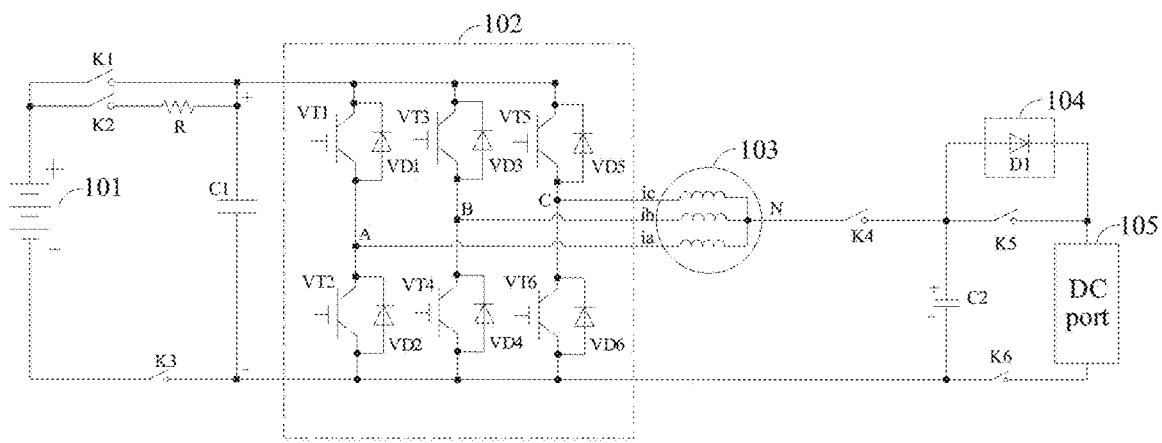
FIG. 11 is a circuit diagram of an energy conversion device according to Embodiment I of the present disclosure.

As shown in FIG. 11, the energy conversion device includes a first switching module and a first energy storage module. The first switching module includes a switch K1, a switch K2, a switch K3, and a resistor R. The first energy storage module includes a capacitor C1, and the reversible PWM rectifier 102 includes a first power switch unit, a second power switch unit, a third power switch unit, a fourth power switch unit, a fifth power switch, and a sixth power switch. A control terminal of each power switch unit is connected with a control module. In the three-phase inverter, the first power switch unit and the second power switch unit form a phase A bridge arm, the third power switch unit and the fourth power switch unit form a phase B bridge arm, and the fifth power switch unit and the sixth power switch unit form a phase C bridge arm. The first power switch unit includes a first upper bridge arm VT1 and a first upper bridge diode VD1, the second power switch unit includes a second lower bridge arm VT2 and a second lower bridge diode VD2, the third power switch unit includes a third upper bridge arm VT3 and a third upper bridge diode VD3, the fourth power switch unit includes a fourth lower bridge arm VT4 and a fourth lower bridge diode VD4, the fifth power switch unit includes a fifth upper bridge arm VT5 and a fifth upper bridge diode VD5, and the sixth power switch unit includes a sixth lower bridge arm VT6 and a sixth lower bridge diode VD6. The motor 103 includes three phase coils, the energy conversion device further includes a second energy storage device and a second switching module, the second energy storage device includes a capacitor C2, the second switching module includes a switch K5 and a switch K6, and the one-way conduction module 104 includes a diode D1.

Figure 12:
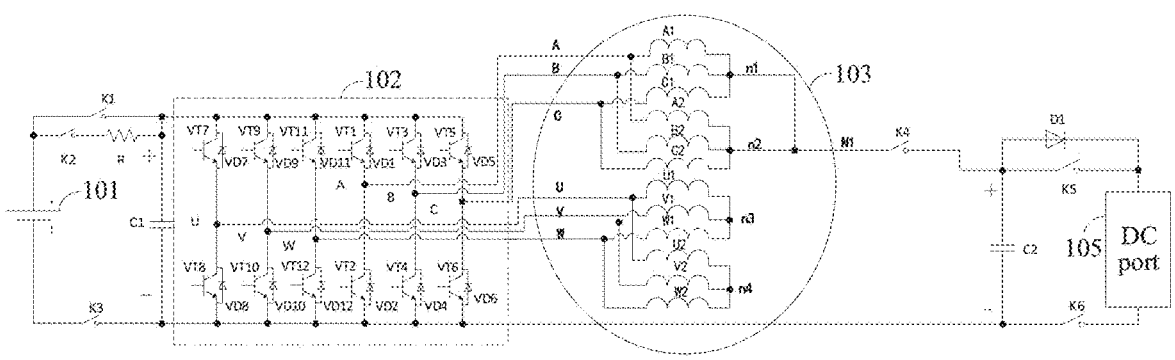
FIG. 12 is another circuit diagram of an energy conversion device according to Embodiment I of the present disclosure.

As shown in FIG. 12, the energy conversion device includes a reversible PWM rectifier 102, a motor coil 103, a switch K1, a switch K2, a resistor R, a switch K3, and a capacitor C1. A positive electrode of the external battery 101 is connected with a first end of the switch K1 and a first end of the switch K2. A second end of the switch K1 and a second end of the switch K2 are connected with a first end of the capacitor C1. A negative electrode of the external battery 101 is connected with a first end of the switch K3. A second end of the switch K3 is connected with a second end of the capacitor C1. The reversible PWM rectifier 102 includes six phase bridge arms. A first phase bridge arm includes a first power switch unit and a second power switch unit connected in series, a second phase bridge arm includes a third power switch unit and a fourth power switch unit connected in series, a third phase bridge arm includes a fifth power switch unit and a sixth power switch unit connected in series, a fourth phase bridge arm includes a seventh power switch unit and an eighth power switch unit connected in series, a fifth phase bridge arm includes a ninth power switch unit and a tenth power switch unit connected in series, and a sixth phase bridge arm includes an eleventh power switch unit and a twelfth power switch unit connected in series. An input terminal of the first power switch unit, an input terminal of the third power switch unit, an input terminal of the fifth power switch unit, an input terminal of the seventh power switch unit, an input terminal of the ninth power switch unit, and an input terminal of the eleventh power switch unit are connected together with the first end of the capacitor C1 to form a first bus terminal. An output terminal of the second power switch unit, an output terminal of the fourth power switch unit, an output terminal of the sixth power switch unit, an output terminal of the eighth power switch unit, an output terminal of the tenth power switch unit, and an output terminal of the twelfth power switch unit are connected together with the second end of the capacitor C1 to form a second bus terminal. The first power switch unit includes a first upper bridge arm VT1 and a first upper bridge diode VD1, the second power switch unit includes a second lower bridge arm VT2 and a second lower bridge diode VD2, and the third power switch unit includes a third upper bridge arm VT3 and the third high-bridge diode VD3. The fourth power switch unit includes a fourth lower bridge arm VT4 and a fourth lower bridge diode VD4, the fifth power switch unit includes a fifth upper bridge arm VT5 and a fifth upper bridge diode VD5, and the sixth power switch unit includes a sixth lower bridge arm VT6 and a sixth lower bridge diode VD6. The seventh power switch unit includes a seventh upper bridge arm VT7 and a seventh upper bridge diode VD7, the eighth power switch unit includes an eighth lower bridge arm VT8 and an eighth lower bridge diode VD8, and the ninth power switch unit includes a ninth upper bridge arm VT9 and a ninth upper bridge diode VD9. The tenth power switch unit includes a tenth lower bridge arm VT10 and a tenth lower bridge diode VD10, the eleventh power switch unit includes an eleventh upper bridge arm VT11 and an eleventh upper bridge diode VD11, and the twelfth power switch unit includes a twelfth lower bridge arm VT12 and a twelfth lower bridge diode VD12. The motor coil 103 includes a first winding unit and a second winding unit. The first winding unit includes a set of three phase windings. Each phase winding includes two phase coils. Coils A1 and A2 of the first phase coil are connected together with a midpoint A of the first phase bridge arm, coils B1 and B2 of the second phase coil are connected together with a midpoint B of the second phase bridge arm, and coils C1 and C2 of the third phase coil are connected together with a midpoint C of the third phase bridge arm. The coil A1, the coil B1, and the coil C1 are connected together to form a first connection point n1, and the coil A2, the coil B2, and the coil C2 are connected together to form a second connection point n2. The second winding unit includes a set of three phase windings. Each phase winding includes two coils. Coils U1 and U2 in the first phase coil are connected together with a midpoint U of the fourth phase bridge arm, coils V1 and V2 of the second phase coil are connected together with a midpoint V of the fifth phase bridge arm, and coils W1 and W2 of the third phase coil are connected together with a midpoint W of the sixth phase bridge arm. The coil U1, the coil V1, and the coil W1 are connected together to form a third connection point n3, and the coil U2, the coil V2, and the coil W2 are connected together to form a fourth connection point n4. The first connection point n1 and the second connection point n2 are connected together to form a neutral point from which a neutral line is led out. The energy conversion module further includes a switch K4, a switch K5, a switch K6, a capacitor C2, and a diode D1. The first end of the external DC port 105 is connected with a first end of the switch K6, the second end of the external DC port 105 is connected with a first end of the switch K5 and a cathode of the diode D1. An anode of the diode D1 is connected with the second end of the switch K5, the first end of the switch K4, and the first end of the capacitor C2. The second end of the switch K4 is connected with the neutral line, and the second end of the switch K6 is connected with the second end of the capacitor C2 and the second bus terminal of the reversible PWM rectifier 102.

Figure 13:
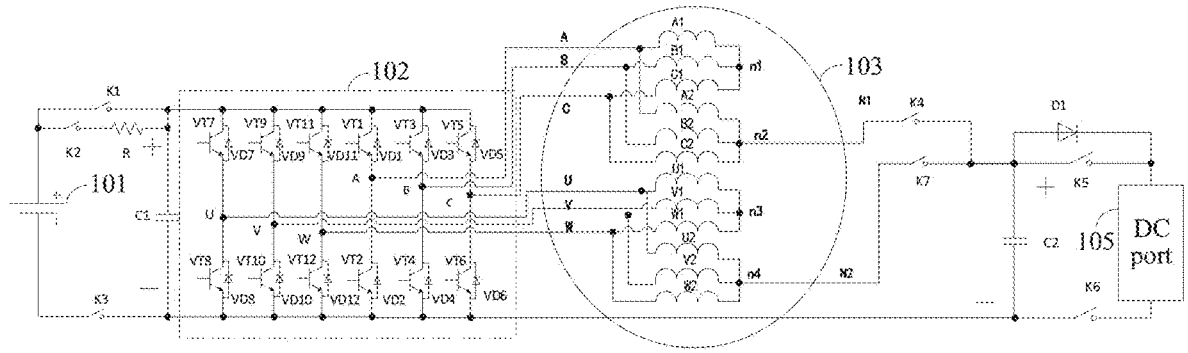
FIG. 13 is another circuit diagram of an energy conversion device according to Embodiment I of the present disclosure.

As shown in FIG. 13, a difference from FIG. 12 is as follows. The energy conversion module includes a switch K7, the second connection point n2 forms a first neutral point and a first neutral line is led out from the first neutral point. The first neutral line is connected with the second end of the switch K4, and the fourth connection point n4 forms a second neutral point and a second neutral line is led out from the second neutral point. The second neutral line is connected with the second end of the switch K7, and the first end of the switch K4 and the first end of the switch K7 are connected together with the anode of the diode D1.

Figure 14:
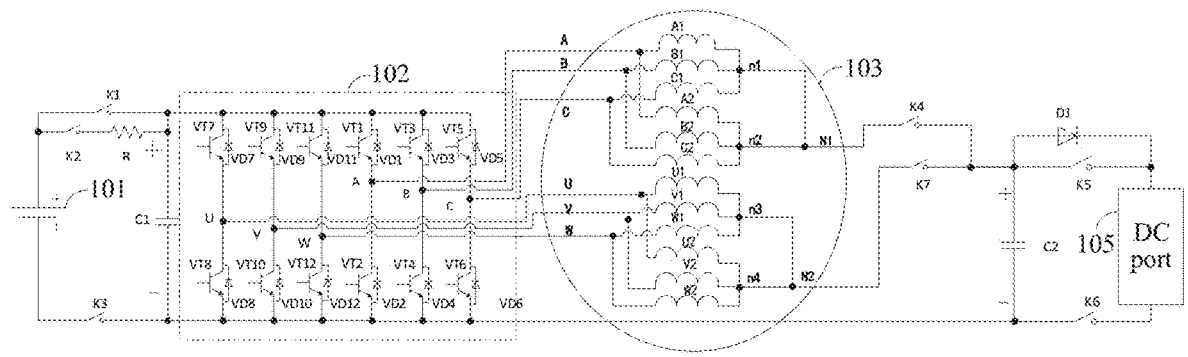
FIG. 14 is another circuit diagram of an energy conversion device according to Embodiment I of the present disclosure.

As shown in FIG. 14, a difference from FIG. 13 is as follows. The first connection point n1 and the second connection point n2 are connected together to form a first neutral point and a first neutral line is led out from the first neutral point. The third connection point n3 and the fourth connection point n4 form a second neutral point and a second neutral line is led out from the second neutral point, and the second neutral line is connected with the second end of the switch K7.

Figure 15:
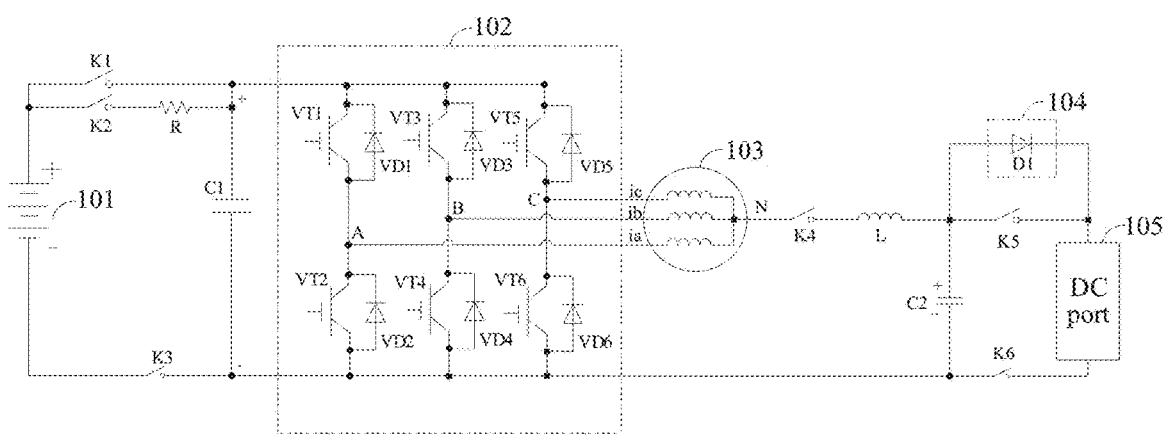
FIG. 15 is another circuit diagram of an energy conversion device according to Embodiment I of the present disclosure.

As shown in FIG. 15, a difference from FIG. 11 is as follows. An inductor L is added to form an LC resonance module with the capacitor C2.

As shown in FIG. 16, a difference from FIG. 15 is as follows. The first connection point n1 and the second connection point n2 in the motor coil 103 form a neutral point and a neutral line is led out from the neutral point.

Figure 17:
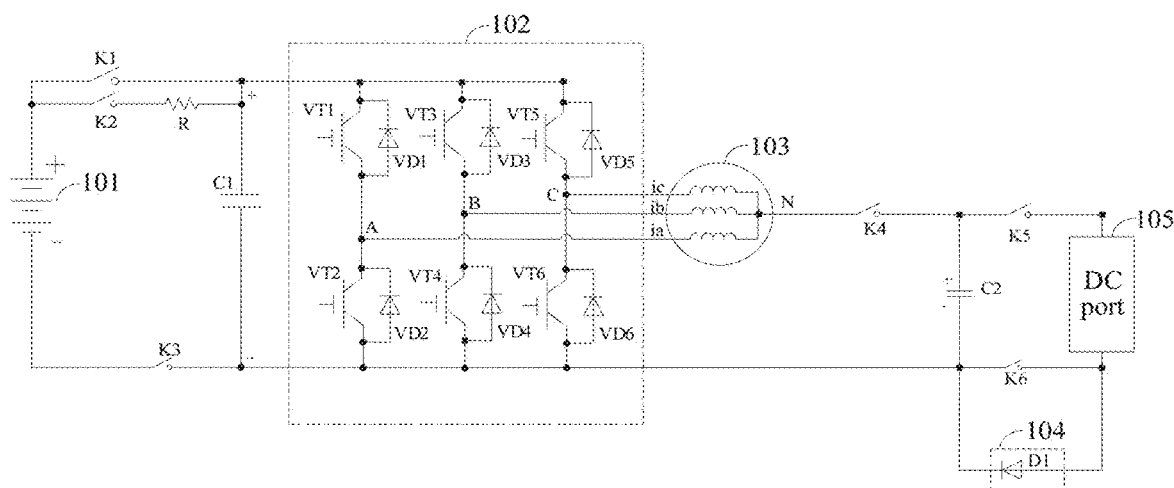
FIG. 17 is another circuit diagram of an energy conversion device according to Embodiment I of the present disclosure.

As shown in FIG. 17, a difference from FIG. 15 is as follows. The anode of the diode D1 is connected with the DC port 105, and the cathode of the diode is connected with the second end of the capacitor C2.

Embodiment II of the present invention provides a discharging method. Based on the energy conversion device of Embodiment I, the discharging method includes the following steps.

Step S10: Acquiring a connection status of a DC port 105.

In step S10, the connection status refers to whether the DC port 105 is connected with an external device, and the DC port 105 is connected with a voltage collection module. When the DC port 105 is connected with a power module, the voltage collection module collects the voltage of the power module, and a change in the connection status is determined according to a change in the voltage on the voltage collection module.

Step S20: When the DC port 105 is connected with the power module and it is detected that the power module satisfies the discharging condition, the reversible PWM rectifier 102 is controlled to cause the energy conversion device to discharge the power module.

In step S20, it is determined, according to the change in the collected voltage, that the DC port 105 module is connected with the power module, and then it is determined, according to the collected voltage, whether the power module satisfies the discharging condition. The discharging condition may be an acquired voltage range of the rechargeable battery 101. When the discharging condition is satisfied, a DC charging and discharging circuit may be formed by the reversible PWM rectifier 102 according to the external control signal, so that the energy conversion device discharges the DC electric device.

Embodiment II of the present invention provides technical effects of a discharging method as follows. The reversible PWM rectifier 102 and the motor coil 103 are disposed in the energy conversion device to form a DC charging and discharging circuit with the external battery 101. The external discharging is performed by using the DC charging and discharging circuit, so that the electric device is discharged when the power of the external battery 101 is relatively high. In addition, the DC charging and discharging circuit adopts the reversible PWM rectifier 102 and the motor coil 103, thereby implementing the function of DC charging and discharging by using a simple circuit structure.

In an implementation, the detecting that the power module satisfies the discharging condition includes:
acquiring an output voltage range of the battery 101,
collecting a voltage of the power module, and
determining whether the voltage of the power module is within the output voltage range, if so, determining that the power module satisfies the discharging condition, and if not, determining that the power module does not satisfy the DC discharging condition.

In the above steps, the output voltage range of the battery 101 may be acquired in the following manners. The battery 101 is connected with an energy storage module, and the energy storage module is pre-charged by the battery 101 before the battery 101 is discharged. The battery 101 manager is configured to detect the voltage of the energy storage module to detect the output voltage range of the battery 101, and then determine, depending on whether the collected voltage is within the output voltage range, whether the power module satisfies the DC discharging condition.

In an implementation, the controlling the reversible PWM rectifier 102 to cause the energy conversion device to discharge the power module includes:

controlling the reversible PWM rectifier 102 to alternately perform the charging process of the coil of the motor by the battery 101 and the discharging process of the power module by the coil of the motor, so that the energy conversion device discharges the power module.

Figure 18:
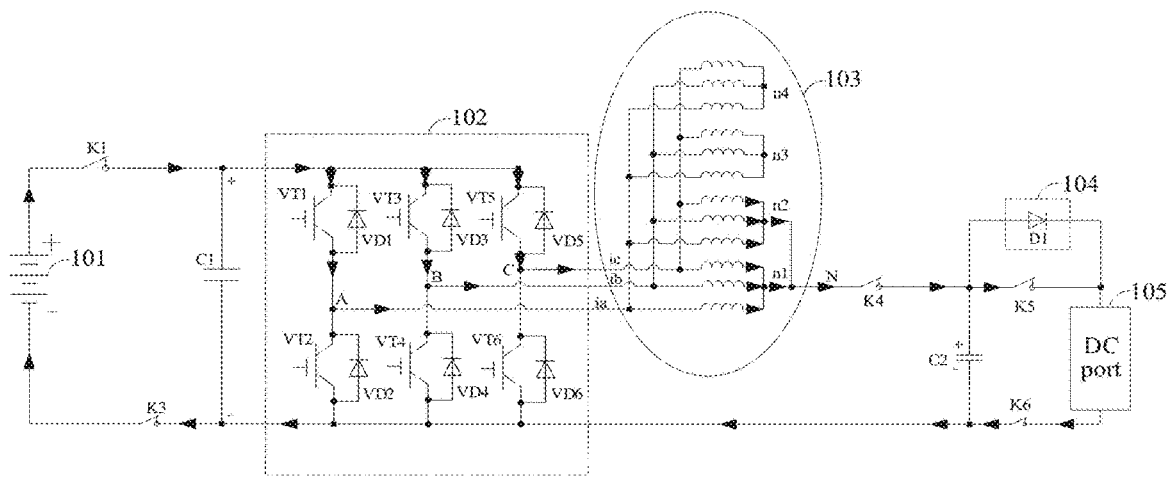
FIG. 18 is a current flow diagram of an energy conversion device according to Embodiment II of the present disclosure.
Figure 19:
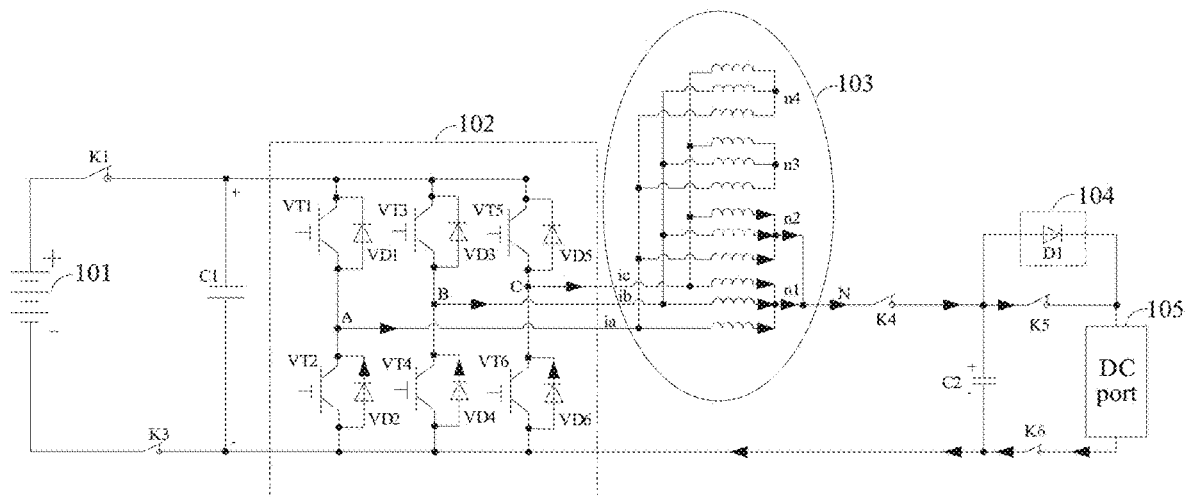
FIG. 19 is another current flow diagram of an energy conversion device according to Embodiment II of the present disclosure.

The present embodiment is described below by using a specific circuit structure. As shown in FIG. 18 and FIG. 19, the operating process diagram of the present embodiment is as follows.

Parking Reduction Voltage Discharging Mode:

when the DC port 105 is connected with the DC electric device, the switch K1, the switch K3, the switch K4, the switch K5, and the switch K6 are controlled to be turned off. A plurality of phase bridge arms of the motor may be controlled by a same phase or staggered phases. An angle by which the phases are staggered in the phase-staggered control is 360 divided by a number of phases of the motor, which increases the equivalent inductance of the motor and reduces the discharging ripple of the battery 101. By means of the alternate conduction of the upper bridge arm and the lower bridge arm, the motor winding coils may store energy and release the energy storage of the winding coils. A bus voltage is dropped to the required voltage for output or the output current is controlled to the required value, so as to perform reduction voltage discharge output for the battery 101. FIG. 18 is a schematic diagram of the current flow in an energy storage stage of an inductor of an external step-down discharge motor. A DC energy storage circuit is formed by the external battery 101, the switch K1, the reversible PWM rectifier 102 (the first upper bridge arm VT1, the third upper bridge arm VT3, and the fifth upper bridge arm VT5), the motor coil 103, the switch K4, the switch K5, the DC port 105, the DC electric device, the switch K6, and the switch K3. The current flow is: a positive electrode of the battery 101, the switch K1, the reversible PWM rectifier 102 (the first upper bridge arm VT1, the third upper bridge arm VT3, and the fifth upper bridge arm VT5), the AC motor winding, the connection point n1 and the connection point n2 of the motor coil, the neutral line N of the motor coil, the switch K4, the switch K5, the external DC port 105, the DC power module, the switch K6, the switch K3, and a negative electrode of the external battery 101, so as to perform energy storage of the motor inductor.

FIG. 19 is a schematic diagram of the current flow in an energy storage release stage of an inductor of an external step-down discharge motor. A DC discharging circuit is formed by the reversible PWM rectifier 102 (the second lower bridge diode VD2, the fourth lower bridge diode VD4, and the sixth lower bridge diode VD6), the motor coil 103, the switch K4, the switch K5, the external DC port 105, the DC electric device, and the switch K6. The current flow is: the reversible PWM rectifier 102, the AC motor winding, the connection point and the connection point n2 of the motor coil, the neutral line N of the motor coil, the switch K4, the switch K5, the DC port 105, the DC power module, the switch K6, and the reversible PWM rectifier 102 (the second lower bridge diode VD2, the fourth lower bridge diode VD4, and the sixth lower bridge diode VD6), so as to perform the energy storage release of the motor inductor.

As shown in FIG. 20 to FIG. 24, the operating process diagram of the parking boost discharging mode of this embodiment is as follows.

When the voltage that the DC port 105 is required to output is higher than the maximum voltage that the battery 101 may output, the switch K2 and the switch K5 are open, and the switch K1, the switch K3, the switch K4, and the switch K6 are closed. The alternating conduction of the upper bridge arm and the lower bridge arm of the reversible PWM rectifier 102 is controlled, which may be controlled in the same phase or in staggered phases by an angle equal to 360 divided by a number of phases of the motor. The same phase is preferably selected for control by LC resonance.

Figure 20:
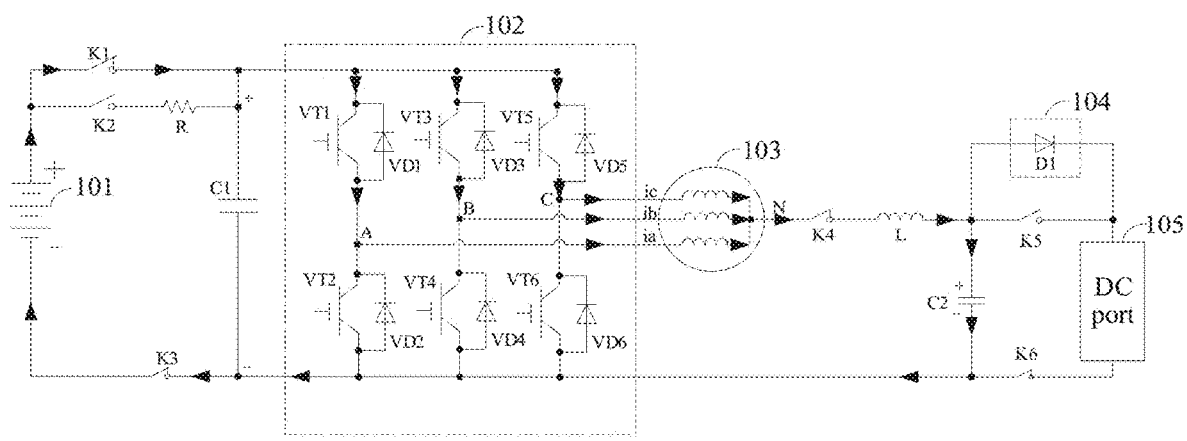
FIG. 20 is a current flow diagram of an energy conversion device according to Embodiment II of the present disclosure.

FIG. 20 is schematic diagram showing the discharge of the external battery 101, the inductance of the motor coil, the energy storage of the external inductor, and the current flow in the capacitor charging stage during the LC resonance. An energy storage circuit is formed by the external battery 101, the switch K1, the reversible PWM rectifier 102 (the first upper bridge arm VT1, the third upper bridge arm VT3, and the fifth upper bridge arm VT5), the motor coil 103, the switch K4, the inductor L, and the capacitor C2. The current flow is: a positive electrode of the external battery 101, the switch K1, the reversible PWM rectifier 102 (the first upper bridge arm VT1, the third upper bridge arm VT3, and the fifth upper bridge arm VT5), the AC motor winding, the motor N line, the inductor L, the capacitor C2, the switch K3, and a negative electrode of the external battery 101, so as to perform energy storage of the motor inductor and the external inductor and charging of the capacitor 110. The process acts as starting of oscillation of the resonance circuit and the function of the energy supplement for the resonance circuit by the discharge of the battery 101 during the resonance.

Figure 21:
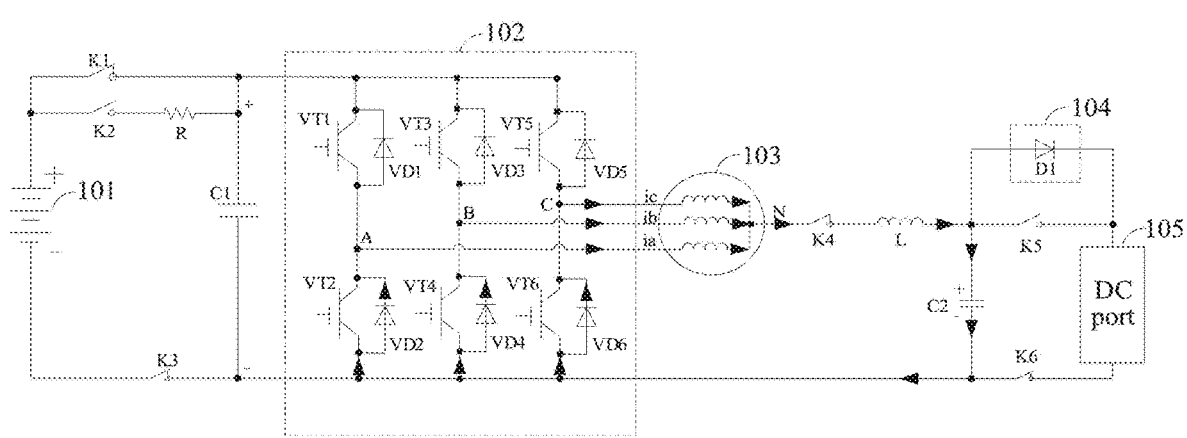
FIG. 21 is another current flow diagram of an energy conversion device according to Embodiment II of the present disclosure.

FIG. 21 is a schematic diagram of the current flow in the charging stage of the motor inductor and the freewheeling of the external inductor to the capacitor 110 during the LC resonance. A freewheeling circuit is formed by the reversible PWM rectifier 102 (the second lower bridge diode VD2, the fourth lower bridge diode VD4, and the sixth lower bridge diode VD6), the motor coil 103, the switch K4, the inductor L, and the capacitor C2. The current flow is: an AC motor winding, the motor N line, the inductor L, the capacitor C2, the reversible PWM rectifier 102 (the second lower bridge diode VD2, the fourth lower bridge diode VD4, and the sixth lower bridge diode VD6) flowing back to the AC motor winding. In this process, the energy in the motor inductor and the external inductor is transferred to the capacitor C2.

Figure 22:
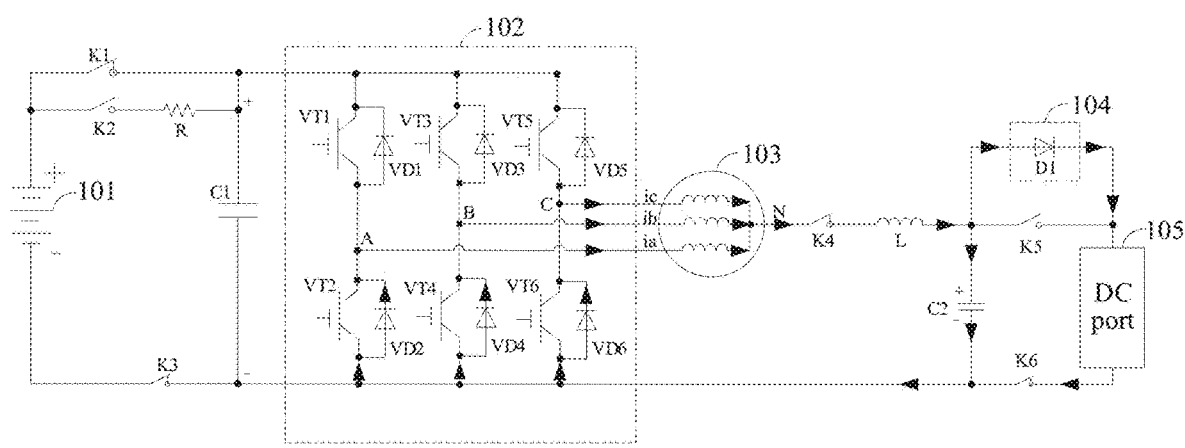
FIG. 22 is another current flow diagram of an energy conversion device according to Embodiment II of the present disclosure.

FIG. 22 is a schematic diagram of the current flow the freewheeling capacitor 110 of the motor inductor and the external inductor in the external discharge stage during the LC resonance. A discharging circuit is formed by the reversible PWM rectifier 102 (the second lower bridge diode VD2, the fourth lower bridge diode VD4, and the sixth lower bridge diode VD6), the motor coil 103, the switch K4, the inductor L, the diode D1, the external DC port 105, the DC electric device, and the switch K6. The current flow is: an AC motor winding, the motor N line, the switch K4, the inductor L, the capacitor C2 (simultaneously passing through the diode 131 to the DC port 105), the reversible PWM rectifier 102 (the second lower bridge diode VD2, the fourth lower bridge diode VD4, and the sixth lower bridge diode VD6) flowing back to the AC motor winding. This process is that the energy in the inductor is transferred to the capacitor C2, the voltage of the capacitor C2 is higher than the voltage at the DC port, and the energy in the motor inductor and the external inductor releases the external DE DC port until the stored energy in the motor inductor and the external inductor is released.

Figure 23:
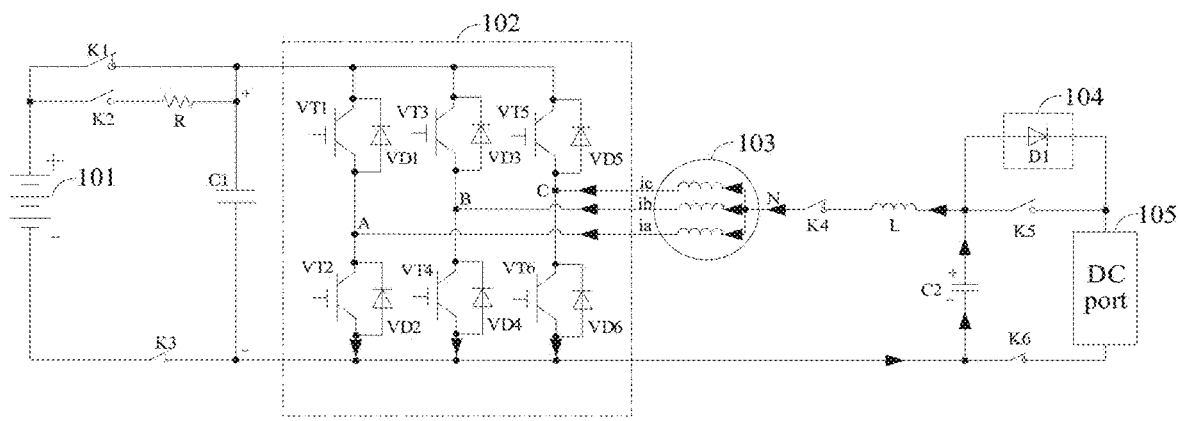
FIG. 23 is another current flow diagram of an energy conversion device according to Embodiment II of the present disclosure.

FIG. 23 is a schematic diagram of the current flow in a reverse energy storage stage of the motor inductor and the external inductor through discharging on the capacitor during the LC resonance. A reverse energy storage circuit is formed by the capacitor C2, the inductor L, the switch K4, the motor coil 103, and the reversible PWM rectifier 102 (the second lower bridge arm VT2, the fourth lower bridge arm VT4, and the sixth lower bridge arm VT6). The current flow is: the capacitor C2, the inductor L, the motor N line, the AC motor winding, and the reversible PWM rectifier 102 (the second lower bridge arm VT2, the fourth lower bridge arm VT4, and the sixth lower bridge arm VT6). The process is that the energy in the capacitor C2 is transferred to the motor inductor and the external inductor until the voltage in the capacitor C2 is zero.

FIG. 23 is a schematic diagram of the current flow in the reverse charging stage of reverse freewheeling of the motor inductor and the external inductor to the capacitor 110 during the resonance. An AC reverse charging circuit is formed by the inductor L, the switch K4, the motor coil 103, the reversible PWM rectifier 102 (the second lower bridge arm VT2, the fourth lower bridge arm VT4, and the sixth lower bridge arm VT6), and the capacitor C2. The current flow is: the inductor L, the switch K4, the motor N line, the AC motor winding, the reversible PWM rectifier 102 (the second lower bridge arm VT2, the fourth lower bridge arm VT4, and the sixth lower bridge arm VT6), and the capacitor C2. This process is that the energy in the motor inductor and the external inductor is transferred to the capacitor C2 until the current in the motor inductor and the external inductor is zero.

Figure 24:
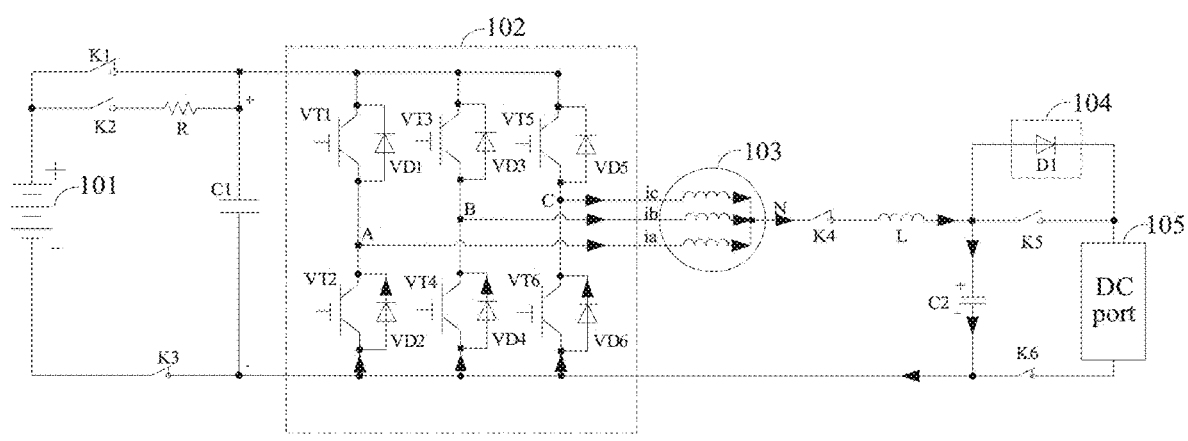
FIG. 24 is another current flow diagram of an energy conversion device according to Embodiment II of the present disclosure.

FIG. 24 is a schematic diagram of the current flow in the energy storage stage of the motor inductor and the external inductor due to capacitor discharge during the resonance. An energy storage circuit is formed by the motor coil 103, the switch K4, the inductor L, the capacitor C2, and the reversible PWM rectifier 102 (the second lower bridge diode VD2, the fourth lower bridge diode VD4, and the sixth lower bridge diode VD6). The current flow is: the capacitor C2, the reversible PWM rectifier 102 (the second lower bridge diode VD2, the fourth lower bridge diode VD4, and the sixth lower bridge diode VD6), the AC motor winding, the motor N line, the inductor L, and the capacitor C2. This process is that the energy in the capacitor C2 is transferred to the motor inductor and the external inductor until the voltage in the capacitor C2 is zero.

Figure 25:
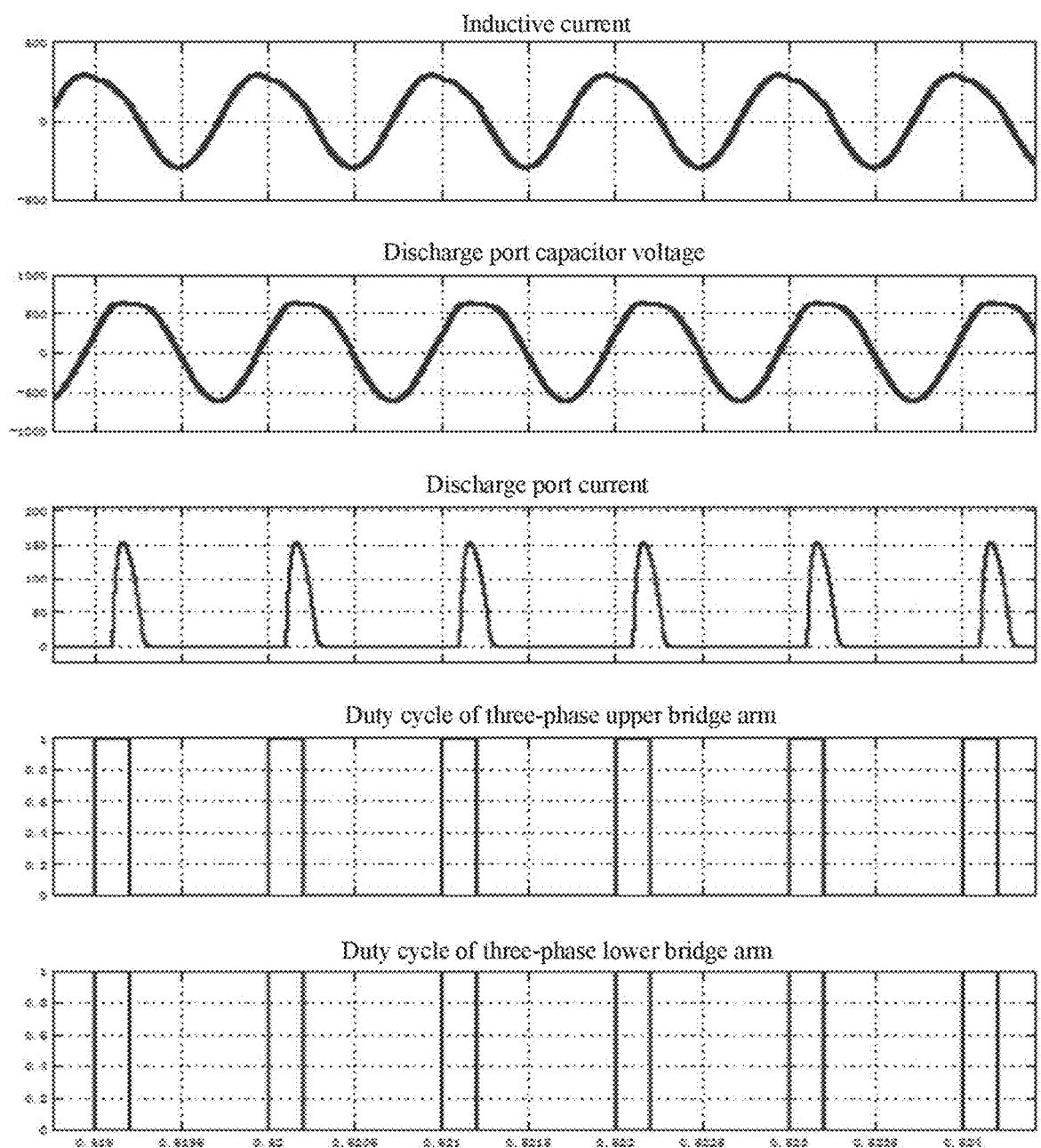
FIG. 25 is a schematic diagram of current waveforms of an energy conversion device according to Embodiment II of the present disclosure.

FIG. 25 is a schematic diagram of current waveforms of a control process of LC resonance boost discharge of vehicle external discharge.

Figure 26:
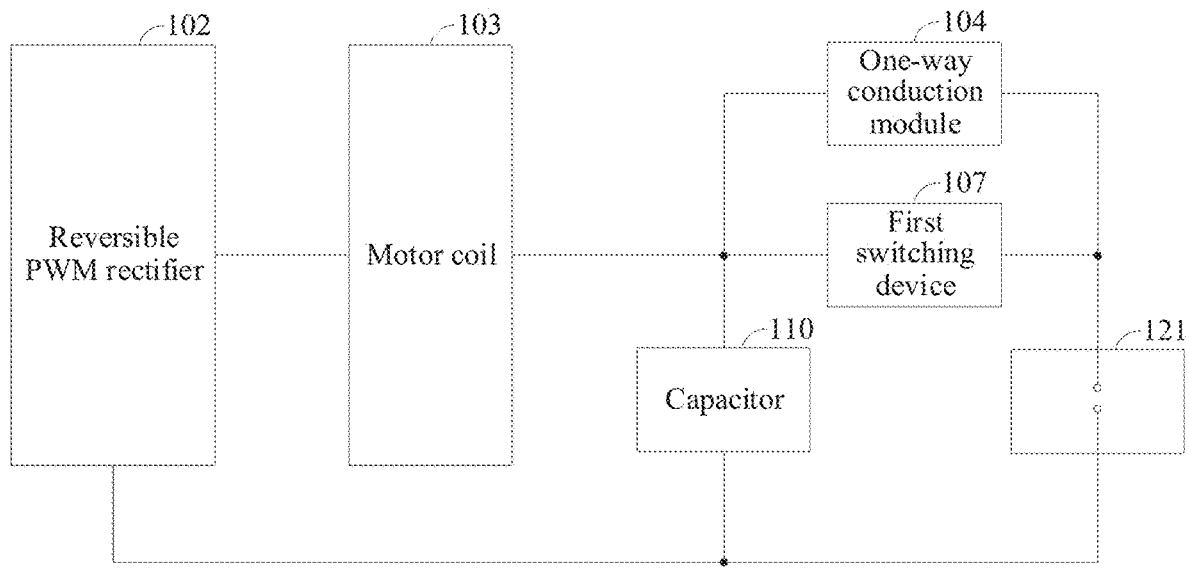
FIG. 26 is a schematic structural diagram of an energy conversion device according to Embodiment III of the present disclosure.
Figure 27:
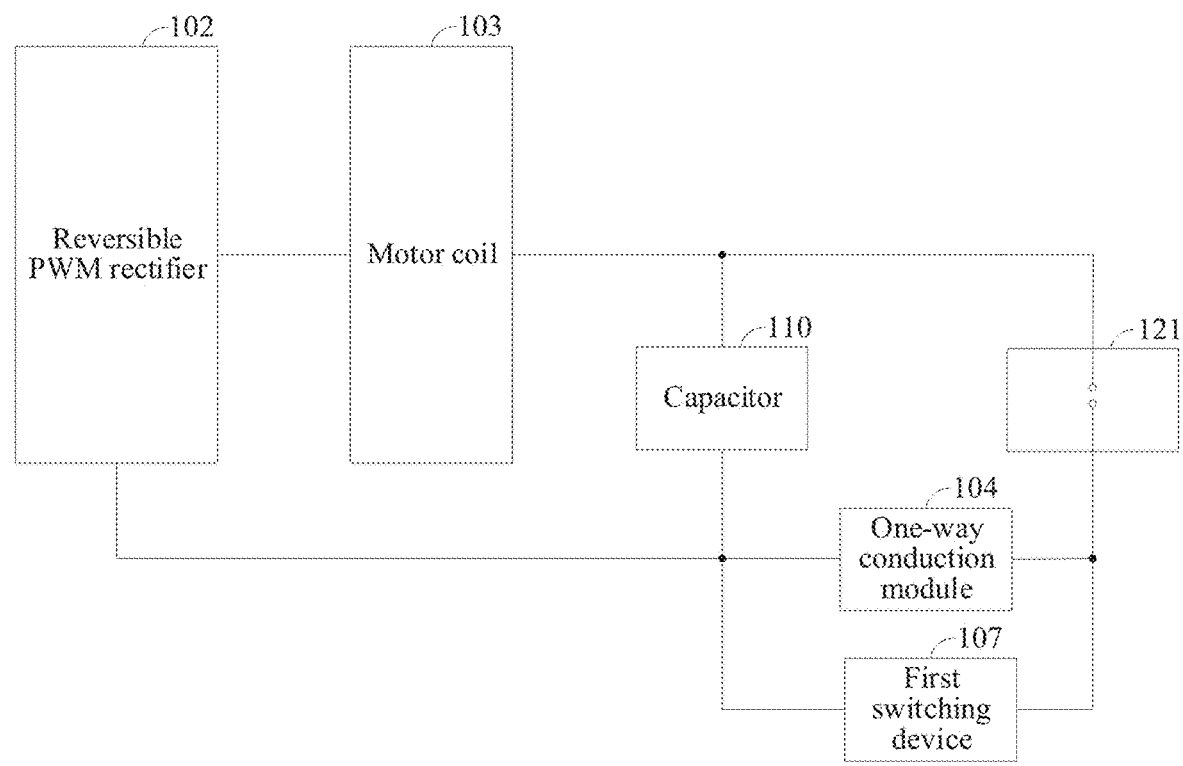
FIG. 27 is another schematic structural diagram of an energy conversion device according to Embodiment III of the present disclosure.

Embodiment III of the disclosure provides an energy conversion device, as shown in FIG. 26 and FIG. 27, including:
- a one-way conduction module 104, including a diode, wherein an anode and a cathode of the diode are respectively a first end and a second end of the one-way conduction module;
- a capacitor 110;
- a reversible PWM rectifier 102, including a plurality of bridge arms, wherein first ends of the plurality of bridge arms are connected together to form a first bus terminal; and second ends of the plurality of bridge arms are connected together to form a second bus terminal;
- a motor coil 103, wherein one ends of the motor coil 103 are connected with midpoints of the plurality of bridge arms; other ends of the motor coil 103 are connected with the first end of the one-way conduction module 104 and a first end of the capacitor 110 by leading out a neutral line; and a second end of the capacitor 110 is connected with the second bus terminal; and
- a charging or discharging connection end set 121, including a first charging or discharging connection end and a second charging or discharging connection end, wherein the first charging or discharging connection end is connected with the second end of the capacitor 110 by using a first switching device; the second charging or discharging connection end is connected with the second end of the one-way conduction module 104; the first end of the capacitor 110 is connected with the second end of the one-way conduction module 104 by using a first switching device 107; or the first charging or discharging connection end is connected with the first end of the one-way conduction module 104; the second end of the capacitor is connected with the first end of the one-way conduction module 104 by using a first switching device 107; and the second charging or discharging connection end is connected with the first end of the capacitor 110 by using the first switching device 107.

The charging or discharging connection terminal set 121 is configured to be connected with an external charging port. For the specific operating mode of this embodiment, reference is made to Embodiment I, and the details will not be described herein again.

Embodiment IV of the disclosure provides a vehicle. The vehicle further includes the energy conversion device provided in Embodiment I and Embodiment II.

Figure 28:
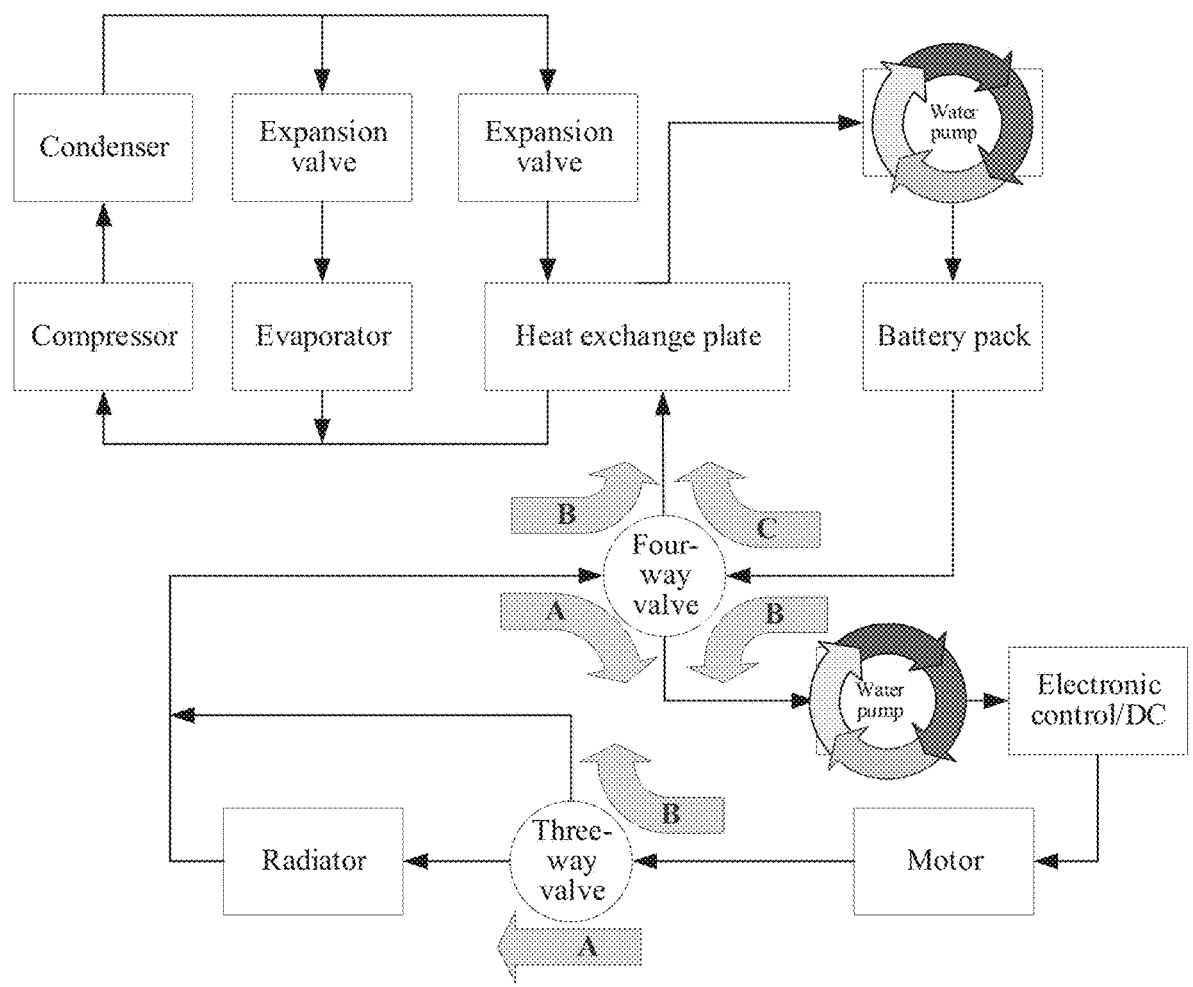
FIG. 28 is a schematic structural diagram of a vehicle according to Embodiment IV of the present disclosure.

As shown in FIG. 28, a heating and cooling circuit of a battery pack includes the following circuits: a motor drive system cooling circuit, a battery cooling system circuit, and a cooling circuit of an air conditioning system. The battery cooling system circuit is integrated with an air conditioning cooling system. The battery cooling system circuit is connected with the motor drive system cooling circuit by using a four-way valve. The motor drive system cooling circuit turns on and off a radiator through switching of a three-way valve. The motor drive system cooling circuit and the battery cooling system circuit are switched by using a valve body to change a flow direction of a coolant in the pipeline, so that the coolant heated by the motor drive system flows to the battery cooling system, thereby completing the heat transfer from the motor drive system to the battery cooling. When the motor drive system is in a non-heating mode, through the switching between the three-way valve and the four-way valve, the coolant of the motor drive system passes through a circuit A, and the coolant of the battery cooling system passes through a circuit C. When the motor is in a heating mode, through the switching between the three-way valve and the four-way valve, the coolant of the motor drive system passes through a circuit B, so that the coolant heated by the motor drive system flows to the cooling circuit of the battery pack to heat the battery.

The foregoing embodiments are merely used for describing the technical solutions of the present disclosure, but does not limit the present disclosure. Although the present disclosure is described in detail with reference to the foregoing embodiments, it should be appreciated by a person skilled in the art that, modifications may still be made to the technical solutions described in the foregoing embodiments, or equivalent replacements may be made to the part of the technical features; and as long as such modifications or replacements do not cause the essence of corresponding technical solutions to depart from the spirit and scope of the technical solutions of the embodiments of the present disclosure, and should be included within the protection scope of the present disclosure.

What is claimed is:

1. An energy conversion device, comprising:
a reversible pulse-width modulation (PWM) rectifier, a motor coil connected with the reversible PWM rectifier, a one-way conductor, and a capacitor, wherein the reversible PWM rectifier further comprises a first bus terminal and a second bus terminal, a neutral line of the motor coil is connected with a first end of the capacitor, and the second bus terminal of the reversible PWM rectifier is further connected with a second end of the capacitor; and
a direct current (DC) charging circuit or a DC discharging circuit is formed by an external DC port with an external battery by using the energy conversion device, and a driving circuit is formed by the external battery with the reversible PWM rectifier and the motor coil in the energy conversion device;
wherein
the one-way conductor is connected between the first end of the capacitor and a second end of the external DC port, a first end of the external DC port is connected with the second end of the capacitor and a negative electrode of the external battery, and a positive electrode of the external battery is connected with the first bus terminal of the reversible PWM rectifier; or
the one-way conductor is connected between the second end of the capacitor and the first end of the external DC port, the second end of the external DC port is connected with the first end of the capacitor, the second end of the capacitor is connected with a negative electrode of the external battery, and a positive electrode of the external battery is connected with the first bus terminal of the reversible PWM rectifier.

2. The energy conversion device according to claim 1, wherein
a first end of the one-way conductor is connected with the first end of the capacitor, and a second end of the one-way conductor is connected with the second end of the external DC port;
the energy conversion device comprises a first switching device, and the first switching device is connected in parallel with the one-way conductor;
a first DC discharging circuit is formed by the external battery with the reversible PWM rectifier, the motor coil, and the first switching device in the energy conversion device, and an external DC port;
a second DC discharging circuit is formed by the external battery with the reversible PWM rectifier, the motor coil, and the one-way conductor in the energy conversion device, and the external DC port; and
the energy conversion device selects, according to an external control signal, the first DC discharging circuit or the second DC discharging circuit to operate.

3. The energy conversion device according to claim 1, wherein
a first end of the one-way conductor is connected with the first end of the external DC port, and the second end of the capacitor is connected with a second end of the one-way conductor;
the energy conversion device comprises a first switching device, and the first switching device is connected in parallel with the one-way conductor;

a first DC charging circuit is formed by the external DC port with the first switching device, the motor coil, and the reversible PWM rectifier in the energy conversion device, and the external battery;
a second DC charging circuit is formed by the external DC port with the one-way conductor, the motor coil, and the reversible PWM rectifier in the energy conversion device, and the external battery; and
the energy conversion device selects, according to an external control signal, the first DC charging circuit or the second DC charging circuit to operate.

4. The energy conversion device according to claim 1, wherein the one-way conductor comprises a diode, and an anode and a cathode of the diode are the first end and the second end of the one-way conductor, respectively.

5. The energy conversion device according to claim 1, wherein
the motor coil comprises x sets of windings, $x \geq 1$, and x is an integer;
a number of phases of an $x^{th}$ set of windings is $m_x$, each phase winding in the $x^{th}$ set of windings comprises $n_x$ coil branches, the $n_x$ coil branches of each phase winding are connected together to form a phase endpoint, one of the $n_x$ coil branches of each phase winding in the $x^{th}$ set of windings is further connected with one of the $n_x$ coil branches of other phase windings to form $n_x$ connection points, $n_x \geq 1$, $m_x \geq 2$, and $m_x$ and $n_x$ are integers;
the x sets of windings form a total of $$\sum_{i=1}^{x} n_i$$

connection points, the $$\sum_{i=1}^{x} n_i$$

connection points form T neutral points, and N neutral lines are led out from the T neutral points;
a range of T is $$\sum_{i=1}^{x} n_i \geq T \geq 1,$$

a range of N is $T \geq N \geq 1$, and T and N are both integers; and
the reversible PWM rectifier comprises K groups of $M_x$ bridge arms, a midpoint of at least one bridge arm of a group of $M_x$ bridge arms is connected with a phase endpoint in a set of $m_x$-phase windings, different phase endpoints are respectively connected to different bridge arms, $M_x \geq m_x$, $K \geq x$, and K and $M_x$ are both integers.

6. The energy conversion device according to claim 5, wherein when $K=1$, $x=1$, and $M_1 \geq m_1 \geq 2$, the reversible PWM rectifier comprises a group of $M_1$ bridge arms, the motor coil comprises a set of $m_1$-phase windings, each phase winding comprises $n_1$ coil branches and forms $n_1$ connection points, and at least one neutral line is led out from the neutral point formed by the $n_1$ connection points, and wherein $n_1 \geq 1$.

7. The energy conversion device according to claim 5, wherein when $K=1$, $x=1$, and $M_1=m_1=3$, the reversible PWM rectifier comprises a group of three bridge arms, the motor coil comprises a set of three phase windings, each phase winding comprises $n_1$ coil branches and forms $n_1$ connection points, and at least one neutral line is lead out from the neutral point formed by the $n_1$ connection points, and wherein $n_1 \geq 1$.

8. The energy conversion device according to claim 7, wherein each phase winding comprises one coil branch and forms one connection point, and one neutral line is led out from the neutral point formed by the one connection point.

9. The energy conversion device according to claim 7, wherein each phase winding comprises four coil branches and forms four connection points, and one neutral line is led out from the neutral point formed by the two connection points.

10. The energy conversion device according to claim 5, wherein the reversible PWM rectifier comprises K groups of $M_1$ bridge arms, $K \geq 1$, and K is an integer;
   the motor coil comprises a first winding unit and a second winding unit, the first winding unit comprises a set of $m_1$-phase windings, each of the $m_1$-phase windings comprises $n_1$ coil branches, the $n_1$ coil branches of each phase winding are connected together to form a phase endpoint, the phase endpoints of the $m_1$-phase windings are connected in a one-to-one correspondence with a midpoint of each of $m_1$ bridge arms of the $M_1$ bridge arms, one of $n_1$ coil branches of each of the $m_1$-phase windings is further connected with one of the $n_1$ coil branches of other phase windings to form $n_1$ connection points, the $n_1$ connection points form $T_1$ neutral points, at least one neutral line is led out from the $T_1$ neutral points, $n_1 \geq 1$, $m_1 \geq 1$, $T_1 \geq 1$, and $n_1$, $m_1$, and $T_1$ are all integers; and
   the second winding unit comprises a set of $m_2$-phase windings, each phase winding in the $m_2$-phase windings comprises $n_2$ coil branches, the $n_2$ coil branches of each phase winding are connected together to form a phase endpoint, the phase endpoints of the $m_2$-phase windings are connected in a one-to-one correspondence with a midpoint of each of $m_2$ bridge arms of the $M_1$ bridge arms, one of the $n_2$ coil branches of each of the $m_2$-phase windings is further connected with one of the $n_2$ coil branches of other phase windings to form $n_2$ connection points, the $n_2$ connection points form $T_2$ neutral points, at least one neutral line is led out from the $T_2$ neutral points, $n_2 \geq 1$, $m_2 \geq 1$, $M_1 \geq m_1 + m_2$, $T_2 \geq 1$, and $n_1$, $m_1$, $M_1$, and $T_2$ are all integers.

11. The energy conversion device according to claim 10, wherein when $m_1 = m_2 = 3$, $M_1 = 6$, and $n_1 = 2$, the first winding unit forms two connection points, one of the connection points forms a first neutral point, a first neutral line is led out from the first neutral point, the second winding unit forms two connection points, one of the connection points forms a second neutral point, and a second neutral line is led out from the second neutral point.

12. The energy conversion device according to claim 10, wherein when $m_1 = m_2 = 3$, $M_1 = 6$, and $n_1 = 2$, the first winding unit forms two connection points, the two connection points are connected together to form a first neutral point, a first neutral line is led out from the first neutral point, the second winding unit forms two connection points, the two connection points form a second neutral point, and a second neutral line is led out from the second neutral point.

13. The energy conversion device according to claim 2, comprising an inductor, wherein one end of the inductor is connected with the neutral line, and another end of the inductor is connected with the first end of the one-way conductor and the first end of the capacitor.

14. The energy conversion device according to claim 13, wherein when the external DC port is connected with a DC electric device, a third DC discharging circuit is formed by the external battery with the reversible PWM rectifier, the motor coil, the inductor, the capacitor, the one-way conductor in the energy conversion device, and the DC electric device;
   the energy conversion device causes, according to an external control signal, the third DC discharging circuit to periodically operate in a first operating stage, a second operating stage, and a third operating stage;
   in the first operating stage, electric energy of the external battery passes through the reversible PWM rectifier, the motor coil, the inductor, and the capacitor, and flows back to the external battery;
   in the second operating stage, a loop current is formed by the motor coil, the inductor, the capacitor, and the reversible PWM rectifier, and electric energy outputted by the motor coil passes through the inductor, the one-way conductor, the DC electric device, and the reversible PWM rectifier, and flows back to the motor coil; and
   in the third operating stage, the electric energy outputted by the capacitor passes through the inductor, the motor coil, and the reversible PWM rectifier, and flows back to the capacitor.

15. The energy conversion device according to claim 2, wherein when the external DC port is connected with a DC electric device, a fourth DC discharging circuit is formed by the external battery with the reversible PWM rectifier, the motor coil, the capacitor, the one-way conductor in the energy conversion device, and the DC electric device;
   the energy conversion device causes, according to an external control signal, the fourth discharging circuit to periodically operate in a first operating stage, a second operating stage, and a third operating stage;
   in the first operating stage, electric energy of the external battery passes through the reversible PWM rectifier, the motor coil, and the capacitor, and flows back to the external battery;
   in the second operating stage, a loop current is formed by the motor coil, the capacitor, and the reversible PWM rectifier, and electric energy outputted by the motor coil passes through the one-way conductor, the DC electric device, and the reversible PWM rectifier, and flows back to the motor coil; and
   in the third operating stage, the electric energy outputted by the capacitor passes through the motor coil and the reversible PWM rectifier, and flows back to the capacitor.

16. The energy conversion device according to claim 15, comprising a first switching device and an inductor, wherein the inductor is connected between the motor coil and the capacitor, and the first switching device is connected in parallel with the one-way conductor;
   when the external DC port is connected with the DC electric device, a fifth discharging circuit is formed by the external battery, the reversible PWM rectifier, the motor coil, the inductor, the first switching device, and the DC electric device;
   the energy conversion device causes, according to an external control signal, the fifth discharging circuit to periodically operate in a first operating stage and a second operating stage;

in the first operating stage, electric energy of the external battery passes through the reversible PWM rectifier, the motor coil, the inductor, the capacitor, and the DC electric device, and flows back to the external battery; and in the second operating stage, the electric energy outputted by the motor coil and the inductor passes through the first switching device, the DC electric device, and the reversible PWM rectifier, and flows back to the motor coil.

17. An energy conversion device, comprising:
a one-way conductor, comprising a diode, wherein an anode and a cathode of the diode are a first end and a second end of the one-way conductor, respectively;
a capacitor;
a reversible PWM rectifier, comprising a plurality of bridge arms, wherein first ends of the plurality of bridge arms are connected together to form a first bus terminal, and second ends of the plurality of bridge arms are connected together to form a second bus terminal;
a motor coil, wherein first ends of the motor coil are connected with midpoints of the plurality of bridge arms, second ends of the motor coil are connected with the first end of the one-way conductor and a first end of the capacitor by leading out a neutral line, and a second end of the capacitor is connected with the second bus terminal; and
a charging or discharging connection end set, comprising a first charging or discharging connection end and a second charging or discharging connection end, wherein
the first charging or discharging connection end is connected with the second end of the capacitor by using a first switching device, the second charging or discharging connection end is connected with the second end of the one-way conductor, and the first end of the capacitor is connected with the second end of the one-way conductor by using the first switching device; or
the first charging or discharging connection end is connected with the first end of the one-way conductor, the second end of the capacitor is connected with the first end of the one-way conductor by using a first switching device, and the second charging or discharging connection end is connected with the first end of the capacitor by using the first switching device.

18. A vehicle, comprising an energy conversion device comprising:
a reversible pulse-width modulation (PWM) rectifier, a motor coil connected with the reversible PWM rectifier, a one-wav conductor, and a capacitor, wherein the reversible PWM rectifier further comprises a first bus terminal and a second bus terminal a neutral line of the motor coil is connected with a first end of the capacitor, and the second bus terminal of the reversible PWM rectifier is further connected with a second end of the capacitor; and
a direct current (DC) charging circuit or a DC discharging circuit is formed by an external DC port with an external battery by using the energy conversion device, and a driving circuit is formed by the external battery with the reversible PWM rectifier and the motor coil in the energy conversion device;
wherein
the one-way conductor is connected between the first end of the capacitor and a second end of the external DC port, a first end of the external DC port is connected with the second end of the capacitor and a negative electrode of the external battery, and a positive electrode of the external battery is connected with the first bus terminal of the reversible PWM rectifier; or
the one-way conductor is connected between the second end of the capacitor and the first end of the external DC port, the second end of the external DC port is connected with the first end of the capacitor, the second end of the capacitor is connected with a negative electrode of the external battery, and a positive electrode of the external battery is connected with the first bus terminal of the reversible PWM rectifier.

\* \* \* \* \*